United States Patent
Paul

(10) Patent No.: US 10,963,128 B1
(45) Date of Patent: Mar. 30, 2021

(54) SYSTEMS AND METHODS FOR CAPTURING CONTENT

(71) Applicant: Facebook, Inc., Menlo Park, CA (US)

(72) Inventor: Debashish Paul, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 29 days.

(21) Appl. No.: 16/124,141

(22) Filed: Sep. 6, 2018

(51) Int. Cl.
*G06F 17/00* (2019.01)
*G06F 3/0482* (2013.01)
*G06F 3/0486* (2013.01)
*G06F 3/16* (2006.01)
*G06F 3/0481* (2013.01)
*H04N 5/76* (2006.01)

(52) U.S. Cl.
CPC .......... *G06F 3/0482* (2013.01); *G06F 3/0486* (2013.01); *G06F 3/04817* (2013.01); *G06F 3/16* (2013.01); *H04N 5/76* (2013.01)

(58) Field of Classification Search
CPC .. G06F 3/0482; G06F 3/04817; G06F 3/0486; G06F 3/16
USPC .......................................................... 715/716
See application file for complete search history.

(56) References Cited

U.S. PATENT DOCUMENTS

| | | | |
|---|---|---|---|
| 8,365,084 B1 * | 1/2013 | Lin .................... | H04N 21/4312 715/769 |
| 8,533,192 B2 * | 9/2013 | Moganti ............... | G06F 16/748 707/737 |
| 8,745,502 B2 * | 6/2014 | Snibbe ................... | G06Q 10/10 715/733 |
| 2004/0221244 A1 * | 11/2004 | Baldino ................... | G06F 16/58 715/835 |
| 2011/0052146 A1 * | 3/2011 | Murthy ............... | H04N 7/17318 386/243 |
| 2014/0164506 A1 * | 6/2014 | Tesch ...................... | H04L 51/32 709/204 |
| 2014/0258903 A1 * | 9/2014 | Kanbara ............. | G06F 3/04817 715/765 |
| 2015/0032771 A1 | 1/2015 | Berio | |
| 2015/0089421 A1 * | 3/2015 | Kagei ................... | G06F 3/0488 715/769 |

(Continued)

FOREIGN PATENT DOCUMENTS

WO    2020/051350 A1    3/2020

OTHER PUBLICATIONS

International Search Report and Written Opinion received for PCT Application No. PCT/US2019/049776 dated Oct. 24, 2019, 10 pages.

*Primary Examiner* — Cong-Lac Huynh
(74) *Attorney, Agent, or Firm* — FisherBroyles, LLP

(57) ABSTRACT

A computer-implemented method for capturing content may include (i) displaying, within a graphical user interface of a media recording application that records media through an input device, a clickable reaction button, (ii) receiving a click of the clickable reaction button within the graphical user interface of the media recording application, and (ii) in response to receiving the click of the clickable reaction button within the graphical user interface of the media recording application, performing both capturing, by the media recording application, media content through the input device recording metadata indicating that a user reacted to the captured media content such that the metadata specifies a reaction that corresponds to the clickable reaction button. Various other methods, systems, and computer-readable media are also disclosed.

20 Claims, 23 Drawing Sheets

(56) References Cited

U.S. PATENT DOCUMENTS

| | | | |
|---|---|---|---|
| 2016/0105382 A1* | 4/2016 | Bin Mahfooz | G06F 3/16 |
| | | | 709/204 |
| 2016/0132231 A1* | 5/2016 | Rathod | H04N 5/23216 |
| | | | 715/719 |
| 2016/0370975 A1* | 12/2016 | Collins | G06F 3/04842 |
| 2017/0185254 A1* | 6/2017 | Zeng | H04L 65/4015 |
| 2017/0309144 A1* | 10/2017 | Hasegawa | G08B 13/1963 |
| 2018/0082313 A1 | 3/2018 | Duggin et al. | |
| 2018/0191962 A1* | 7/2018 | Javier | G06F 16/44 |
| 2018/0249218 A1 | 8/2018 | Sayman | |
| 2018/0335901 A1* | 11/2018 | Manzari | G06F 3/04883 |
| 2019/0205015 A1* | 7/2019 | Smith | G06F 3/0482 |

\* cited by examiner

SYSTEMS AND METHODS FOR CAPTURING CONTENT

BACKGROUND

In the modern field of social networking applications, users typically seek to share with other friends both captured content, such as photographs and videos, and indications of how the users and others reacted to that content. For example, some social networking applications may enable a user to first capture a photograph and then upload the photograph to the social networking application through a backend server. Subsequently, a friend of the user may observe on a news feed that the user uploaded the photograph to the social networking application. In this example, the social networking application may further enable the friend to click an emoji icon to indicate an emotion, corresponding to a facial expression of the emoji icon, that the friend felt when observing the photograph.

Although the techniques outlined above may enable users to share content with their friends, these techniques may nevertheless fail to optimize user experience along one or more dimensions. For example, the multi-step sequence for capturing, uploading, and/or annotating content may be inefficient for a variety of different reasons, as further discussed below. The instant disclosure, therefore, identifies and addresses a need for improved systems and methods for capturing content.

SUMMARY

As will be described in greater detail below, the instant disclosure describes various systems and methods for capturing content. In one example, a computer-implemented method for remediating computing resources may include (i) displaying, within a graphical user interface of a media recording application that records media through an input device, a clickable reaction button, (ii) receiving a click of the clickable reaction button within the graphical user interface of the media recording application, and (iii) in response to receiving the click of the clickable reaction button within the graphical user interface of the media recording application, performing both (i) capturing, by the media recording application, media content through the input device and (ii) recording metadata indicating that a user reacted to the captured media content such that the metadata specifies a reaction that corresponds to the clickable reaction button.

In some examples, the media recording application may be provided by a social networking service. In further examples, the captured media content may include at least one of a photograph, an audio voice recording, and a video.

In some examples, displaying the clickable reaction button includes displaying multiple clickable reaction buttons. In these examples, the user may be enabled to further select a selected one of the multiple clickable reaction buttons by dragging the selected one to a specified location. In some examples, the specified location may include a center of the multiple clickable reaction buttons.

In some examples, the method may further include displaying, in response to receiving the click of the clickable reaction button within the graphical user interface of the media recording application, an additional instance of a graphic of the clickable reaction button to confirm to the user that the clickable reaction button was successfully selected. In further examples, the method may include displaying, in response to receiving the click of the clickable reaction button within the graphical user interface of the media recording application, an additional instance of a photograph that was captured in response to receiving the click of the clickable reaction button within the graphical user interface. In additional examples, the method may further include displaying, within the additional instance of the photograph that was captured in response to receiving the click of the clickable reaction button within the graphical user interface, an additional instance of a graphic of the clickable reaction button to confirm to the user that the clickable reaction button was successfully selected in association with the photograph.

Moreover, in some examples, the method may further include displaying, within the additional instance of the photograph that was captured in response to receiving the click the clickable reaction button within the graphical user interface, a clickable trash button that enables the user to discard the captured photograph rather than saving the captured photograph. Additionally, in some examples the method may further include displaying, within the additional instance of the photograph that was captured in response to receiving the click of the clickable reaction button within the graphical user interface, a text identifier of a name of a location where the photograph was captured.

In some examples, the method may further include displaying, in response to receiving the click of the clickable reaction button within the graphical user interface of the media recording application, multiple additional instances of a graphic of the clickable reaction button to confirm to the user that the clickable reaction button was successfully selected. In these examples, the multiple additional instances of the graphic of the clickable reaction button may be displayed along a periphery of the graphical user interface of the media recording application. In some of these examples, an orientation of each one of the multiple additional instances of the graphic of the clickable reaction button varies randomly.

In some examples, the clickable reaction button includes one of (i) a clickable emoji button including an emoji graphic of a facial expression for an emotion that the user felt in reaction to the captured media content and (ii) a clickable recording button that enables the user to record a recording that describes how the user reacted to the captured media content. In some examples, (i) the clickable reaction button includes the clickable emoji button and (ii) recording metadata indicating that the user reacted to the captured media content such that the metadata specifies a reaction that corresponds to the clickable reaction button includes recording metadata that specifies an emotion that corresponds to the facial expression for the emotion of the emoji graphic. Additionally, or alternatively, (i) the clickable reaction button includes the clickable recording button and (ii) the clickable recording button enables the user to record a voice recording that describes how the user reacted to the captured media content. Moreover, in some of these examples, the clickable recording button includes a graphic displaying a dialogue icon.

In one example, a corresponding system for capturing content may include (i) a display module, stored in memory, that displays, within a graphical user interface of a media recording application that records media through an input device, a clickable reaction button, (ii) a reception module, stored in memory, that receives a click of the clickable reaction button within the graphical user interface of the media recording application, (iii) a performance module, stored in memory that, in response to receiving the click of the clickable reaction button within the graphical user interface of the media recording application, performs both capturing, as part of the media recording application, media content through the input device and recording metadata indicating that a user reacted to the captured media content such that the metadata specifies a reaction that corresponds to the clickable reaction button, and (iv) at least one physical processor configured to execute the display module, the reception module, and the performance module.

In further examples, a corresponding computer-readable medium may include computer-readable instructions that, when executed by at least one processor of a computing device, cause the computing device to: (i) display, within a graphical user interface of a media recording application that records media through an input device, a clickable reaction button, (ii) receive a click of the clickable reaction button within the graphical user interface of the media recording application, and (iii) in response to receiving the click of the clickable reaction button within the graphical user interface of the media recording application, perform both capturing, by the media recording application, media content through the input device and recording metadata indicating that a user reacted to the captured media content such that the metadata specifies a reaction that corresponds to the clickable reaction button.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
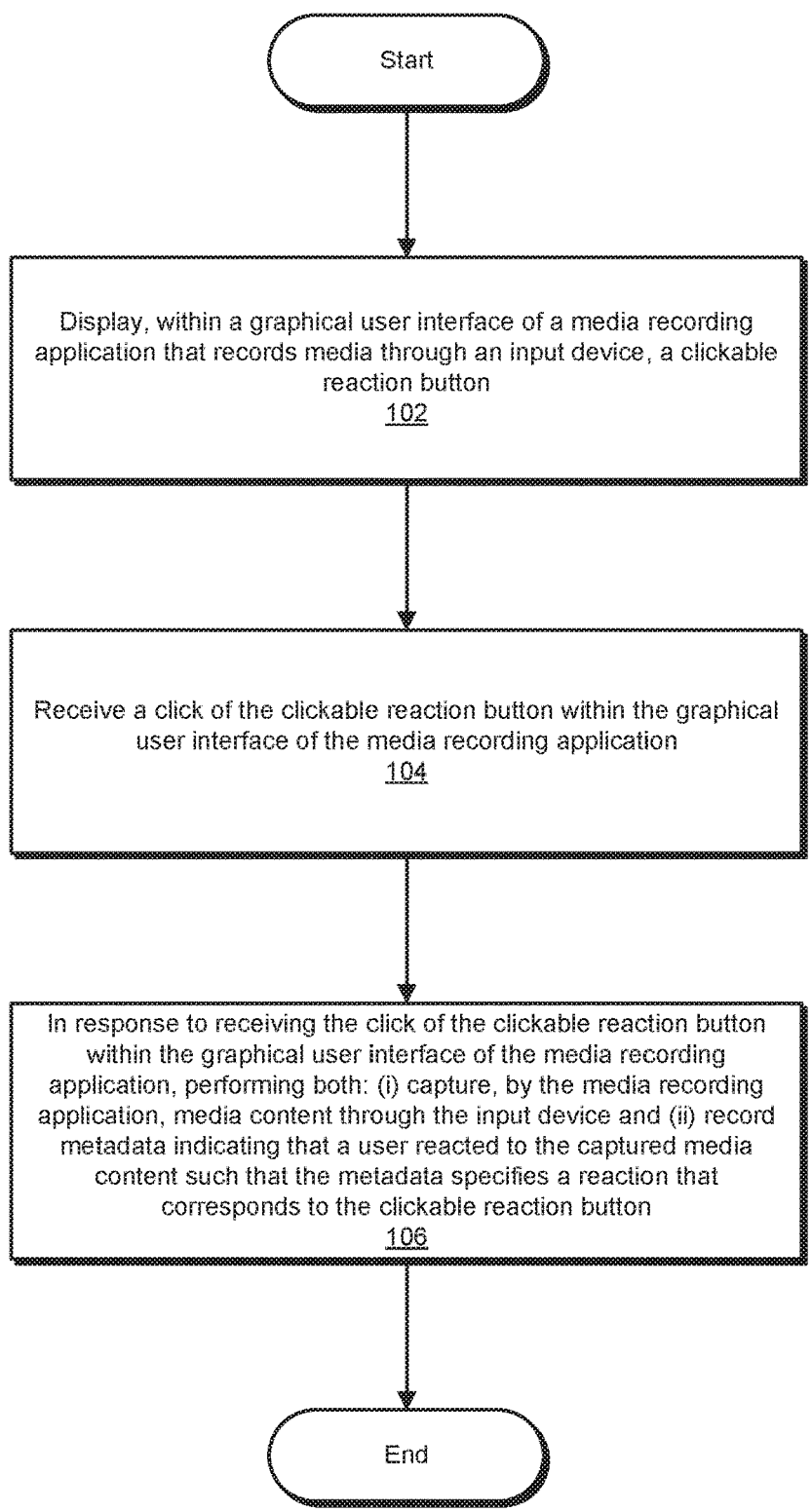
FIG. 1 is a flow diagram of an example method for capturing content.
Figure 2:
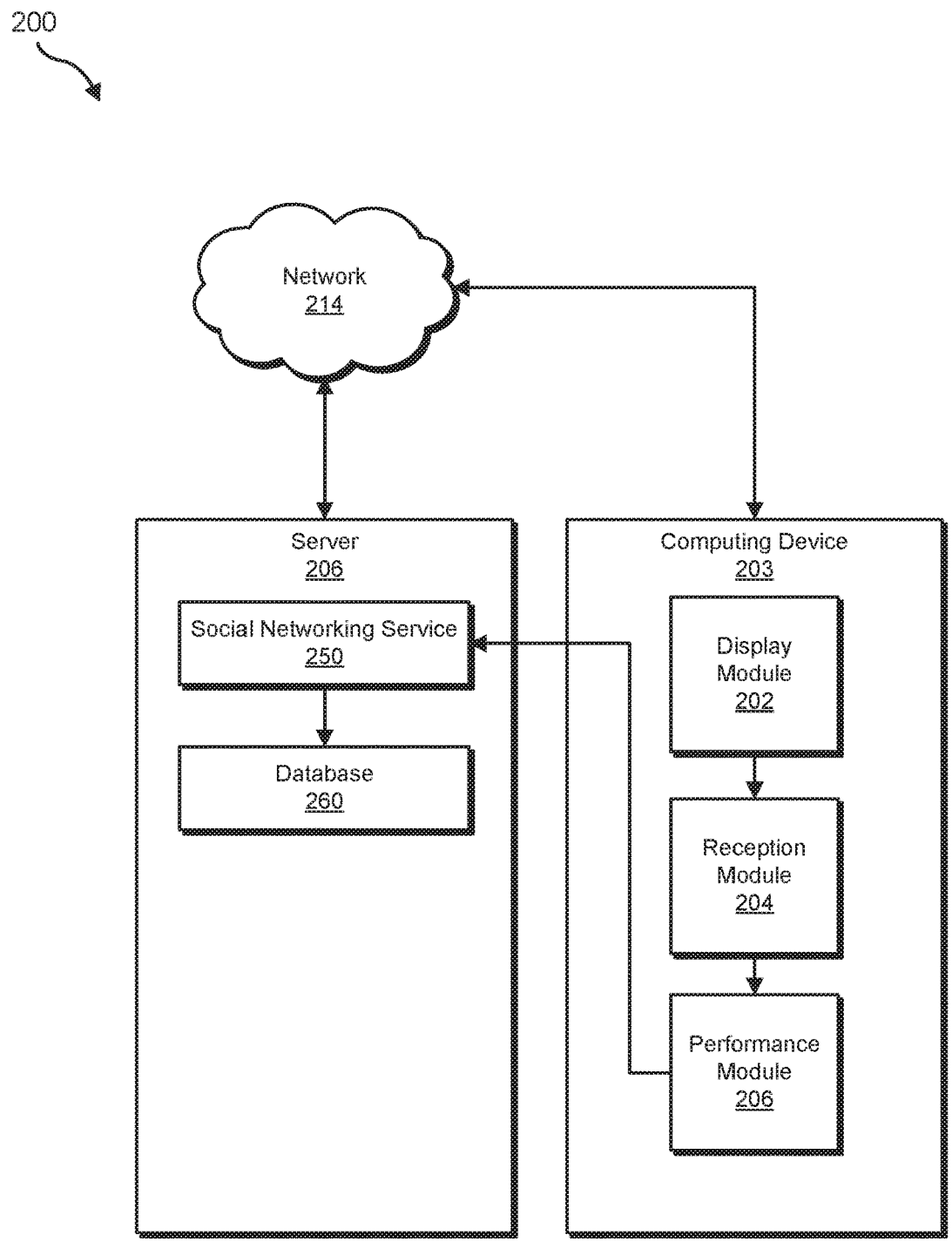
FIG. 2 is a block diagram of an example system for capturing content.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for capturing content. The disclosed subject matter may improve upon related systems and methods by improving the level of efficiency or convenience for capturing content and recording one or more items of information indicating how a user reacted to the captured content. The disclosed subject matter may thereby increase a proclivity of the user to capture content, to annotate the content, and to share the content with other users within a social networking application environment, as discussed in more detail below.

The following will provide, with reference to FIG. 1, detailed descriptions of computer-implemented methods for capturing content. Detailed descriptions of corresponding example systems will also be provided in connection with FIGS. 2-9. Detailed descriptions of an embodiment in which a user may record additional media content to describe how the user is reacting to previously recorded media content will also be provided in connection with FIGS. 10-13. Detailed descriptions of an internal-application-discovery embodiment will further be provided in connection with FIGS. 14-17. Lastly, detailed descriptions of an external-application-discovery embodiment will further be provided in connection with FIGS. 18-23.

FIG. 1 is a flow diagram of an example computer-implemented method 100 for capturing content. The steps shown in FIG. 1 may be performed by any suitable computer-executable code and/or computing system, such as the systems described herein. In one example, each of the steps shown in FIG. 1 may represent an algorithm whose structure includes and/or is represented by multiple sub-steps, examples of which will be provided in greater detail below.

As illustrated in FIG. 1, at step 102, one or more of the systems described herein may display, within a graphical user interface of a media recording application that records media through an input device, a clickable reaction button. For example, as further illustrated in FIG. 2, at step one or two, display module 202 may display, within a graphical user interface of the media recording application that records media through an input device, the clickable reaction button.

Computing device 203 generally represents any type or form of computing device capable of reading computer-executable instructions. For example, computing device 203 may correspond to an end-user customer smartphone that a customer uses at least in part to access a social networking application. Additional examples of computing device 203 may include, without limitation, laptops, tablets, desktops, application servers, database servers, and/or mainframes configured to run certain software applications and/or provide various security, web, storage, and/or management services. Although illustrated as a single entity in FIG. 2, computing device 203 may include and/or represent a plurality of computing devices that work and/or operate in conjunction with one another.

Server 207 generally represents any type or form of computing hardware or software capable of reading computer-executable instructions. For example, server 207 may correspond to a backend server that is maintained by a social networking application vendor to support a corresponding social networking service 250 and its corresponding database 260. Server 207 may also represent part of a cloud-based environment that provides resources to clients. As used herein, the terms "cloud-based environment" or "cloud service" generally refer to a resource or service that is provided over a network, such as the Internet. Additional examples of server 207 include, without limitation, laptops, tablets, desktops, servers, cellular phones, Personal Digital Assistants (PDAs), multimedia players, embedded systems, wearable devices (e.g., smart watches, smart glasses, etc.), gaming consoles, databases, operating systems, software environments, virtual machines, routers and/or network devices, combinations of one or more of the same, and/or any other suitable computing resource.

Network 214 generally represents any medium or architecture capable of facilitating communication or data transfer. In one example, network 214 may facilitate communication between computing device 203 and server 207. Network 214 may also represent a cloud-based network that facilitates communication between multiple computing resources and computing devices to manage the resources. In these examples, network 214 may facilitate communication or data transfer using wireless and/or wired connections. Examples of network 214 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Display module 202 may display the clickable reaction button within the graphical user interface of the media recording application in a variety of ways. As used herein, the term "clickable reaction button" generally refers to either a button that includes a graphic depicting or indicating a sentiment, feeling, emotion, and/or other reaction to corresponding recorded media content or a button that, when clicked, triggers an additional media recording, such as a voice recording or video recording by a user to enable the user to record media describing how the user reacts to other recorded media content, such as a previously recorded photograph or video. In some examples, a length or duration for recording the additional media content may be capped by performance module 206 below a predefined threshold, such as 20 seconds. As further discussed below in connection with step 106, selection of the clickable reaction button by the user may trigger both recording of media content through the input device accessed by the media recording application and recording of metadata that specifies one or more details of how the user reacted to the corresponding media content.

As further outlined above, the clickable reaction button may be displayed within the graphical user interface of a social networking application and/or a media recording application. In some examples, the media recording application may be provided by the social networking application as a subsidiary application within a mobile computing device operating system environment (e.g., the graphical user interface of the social networking application may provide a button that the user may click to trigger execution of the media recording application, as discussed further below). In other examples, the media recording application may simply correspond to a module or component that is included within the social networking application within the mobile computing device operating system environment.

Figure 3:
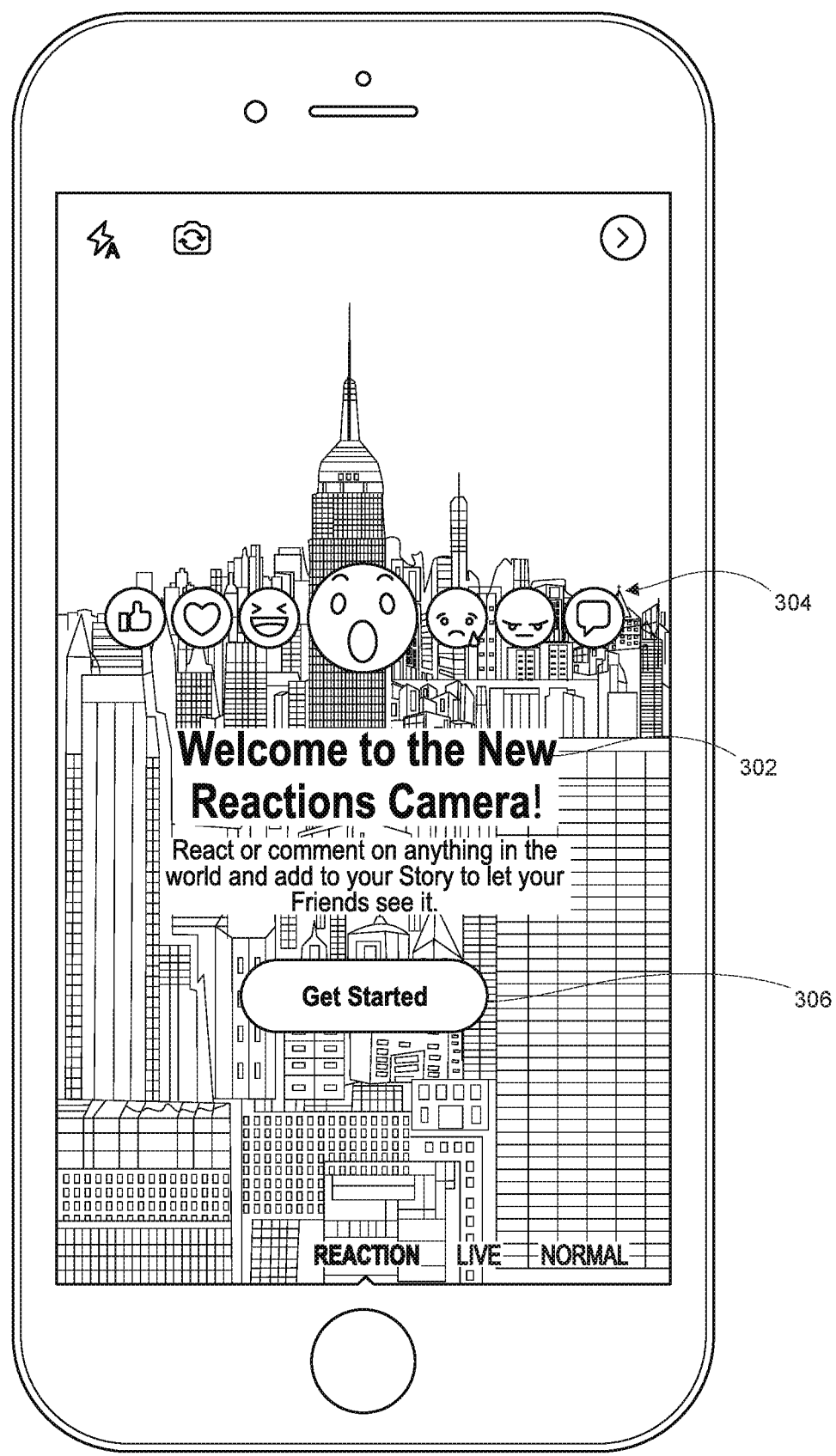
FIG. 3 is an illustration of a welcome screen of the graphical user interface for capturing content.

For example, the media recording application may include a camera and/or video camera recording application. Additionally, or alternatively, the media recording application may include a microphone application, audio recording application, and/or any other suitable multimedia recording application. FIG. 3 shows an illustrative example of a welcome screen when the user first executes the media recording application, which in this example corresponds to a camera or video camera recording application. The media recording application may display the welcome screen in response to the user first selecting a button within the graphical user interface of the social networking application and thereby executing the camera or video camera recording application (e.g., the social networking application may call for execution of the media recording application and thereafter switchover control of the computing device display to the media recording application).

As further shown in FIG. 3, the graphical user interface of the media recording application may display welcome message 302 as part of the welcome screen when the user first executes the media recording application. In some examples, the welcome screen may be displayed upon the first execution of the media recording application by the user after installing the media recording application, whereas subsequent executions of the media recording application may omit display of the welcome screen. Additionally, FIG. 3 further illustrates how the graphical user interface of the media recording application may further display a series 304 of graphics corresponding to clickable reaction buttons, as discussed in more detail below regarding FIG. 4. Moreover, FIG. 3 also illustrates how the graphical user interface of the media recording application may display a button 306 with the text "get started," which may enable the user to bypass the welcome screen and thereby access the primary functionality of the media recording application by capturing content, as discussed in more detail below.

Figure 4:
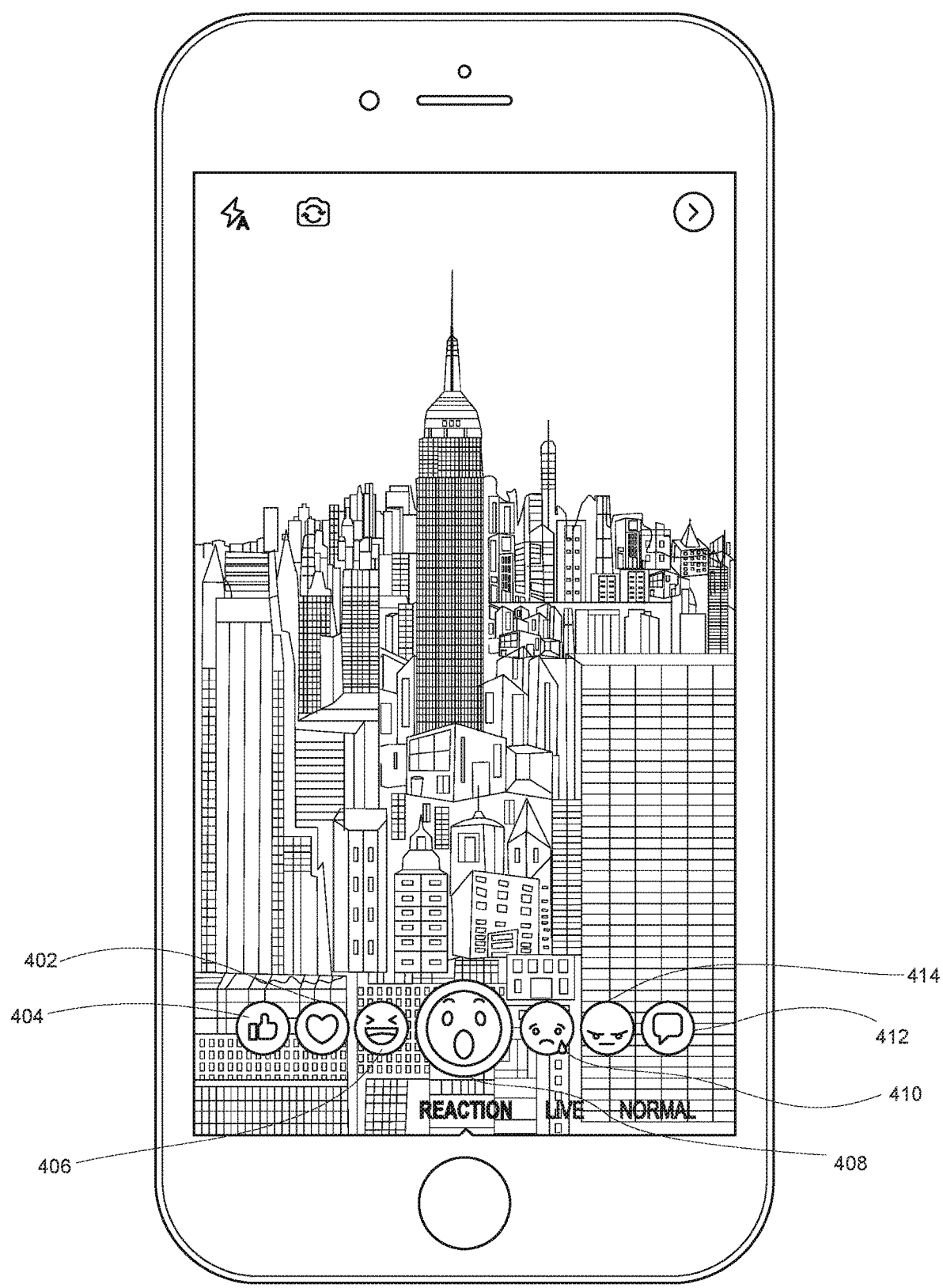
FIG. 4 is an illustration of another view of the graphical user interface for capturing content.

Next, FIG. 4 shows an illustration of the graphical user interface of the media recording application at this stage after presentation of the welcome screen shown in FIG. 3. For example, FIG. 4 shows an example of the graphical user interface after the user selected button 306 shown in FIG. 3. In the example of FIG. 4, the graphical user interface of the media recording application may display a series of clickable reaction buttons, which may correspond to series 304 of corresponding graphics shown in FIG. 3, including a button 402, a button 404, a button 406, a button 408, a button 410, a button 412, and a button 414. In accordance with the description of the term "clickable reaction button" outlined above, each one of the clickable reaction buttons shown in FIG. 4 may either (i) display a graphic, such as an emoji, depicting or indicating a sentiment, emotion, feeling, or other reaction or (ii) display an icon indicating to the user that the user may select the corresponding button to trigger recording of additional media content during which the user may describe how the user is reacting to other or previously recorded media content.

For example, each one of button 402, button 404, button 406, button 408, button 410, and button 414 (but not button 412) shows a graphic that depicts or indicates how the user is reacting to media content, such as an image currently captured by a camera accessed by the media recording application and shown within the central portion of the graphical user interface of FIG. 4 (e.g., the cityscape photograph shown in FIG. 4). More specifically, button 402 depicts a heart icon, thereby indicating that the user is feeling warmth or love in connection with the media content. Button 404 depicts a thumbs-up or positive icon, thereby indicating that the user is feeling approval or positivity in connection with the media content. Button 406 depicts a smiley-face or laughing icon, thereby indicating that the user is feeling happiness or joy in connection with the media content. Button 408 depicts a surprise, shock, or awe icon, thereby indicating that the user is feeling surprise or a similar corresponding emotion in connection with the media content. Button 410 depicts a sad-face icon, thereby indicating that the user is feeling sadness in connection with the media content. Button 414 depicts an angry-face icon, thereby indicating that the user is feeling angry, upset, or resentful in connection with the media content.

In contrast, button 412 depicts a paragraph or dialogue icon, thereby indicating that the user may select button 412 to trigger recording of additional media content, such as the recording of audio voice content, during which the user may describe (e.g., describe in a free-form manner) how the user is feeling or reacting in response to the other recorded media content, such as the cityscape photograph shown in the graphical user interface of FIG. 4. Although button 412 depicts a paragraph or dialogue icon, in other examples button 412 may include any other suitable graphic, such as a microphone icon or video camera icon, that appropriately indicates to the user that the user may select button 412 to thereby trigger recording of the additional media content.

Returning to FIG. 1, at step 104, one or more of the systems described herein may receive a click of the clickable reaction button within the graphical user interface of the media recording application. For example, at step 104, reception module 204 shown in FIG. 2 may receive a click of button 408 within the graphical user interface of the media recording application.

Reception module 204 may receive the click of the clickable reaction button in a variety of ways. In general, reception module 204 may receive the click of the clickable reaction button by detecting that a user pressed a finger on the clickable reaction button, as shown within an interactive display, and then lifted the finger off of the clickable reaction button (e.g., lifted the finger off within a specified duration of time). In other examples, reception module 204 may receive the click of the clickable reaction button through any other suitable input means, such as a voice command indicating toggling of the clickable reaction button.

In some examples, reception module 204 may receive the click of the clickable reaction button at least in part by enabling the user to select a selected one of multiple clickable reaction buttons by dragging the selected one to a specified location. In the example of FIG. 4, display module 202 may enable the user to drag or swipe any one of the multiple clickable reaction buttons (e.g., in either a left direction or a right direction). By dragging or swiping any one of the multiple clickable reaction buttons, the user may thereby relocate the dragged clickable reaction button to a specific location, such as the center of the string or row of clickable reaction buttons shown in FIG. 4. In the specific example of this figure, button 408 has already been disposed at the central location of the multiple clickable reaction buttons, either by default or by the user having previously dragged button 408 to that location.

Moreover, FIG. 4 also further illustrates how display module 202 displays button 408 differently than a remainder of the clickable reaction buttons due to the fact that button 408 is disposed in the specified location at the center of the clickable reaction buttons. More specifically, in the example of FIG. 4, display module 202 may display a larger version of whichever clickable reaction button is disposed at the specified location in comparison to a remainder of the clickable reaction buttons, thereby further confirming to a user observing the graphical user interface that the larger clickable reaction button has been activated, primed, or selected (e.g., without being further toggled to capture content). As used herein, the term activated, primed, or selected, when used in connection with dragging or swiping a clickable reaction button, generally refers to relocating the clickable reaction button to the specified location where the user may successfully press the clickable reaction button to trigger the recording of media content, in accordance with step 106, whereas one or more other clickable reaction buttons outside of this specific location may not trigger the recording of media content when pressed (e.g., because they have not yet been activated).

Accordingly, in the example of FIG. 4, the user may successfully capture content, such as a photograph of the cityscape shown in FIG. 4, by pressing button 408. In contrast, in these examples, if the user presses one or more of the remaining clickable reaction buttons (e.g., inadvertently presses one or more of these buttons), then this pressing may not trigger any corresponding capture of media content, because the remaining clickable reaction buttons have not been dragged or swiped into the specified location such that they become activated, primed, or selected, as further outlined above. Alternatively, in other examples all of the clickable reaction buttons shown in FIG. 4 may be activated in the sense that the user may successfully press any one of them to trigger capturing of media content, and the relocation of one of the clickable reaction buttons to the specified location may only serve the function of increasing the size of that specific clickable reaction button, thereby increasing a convenience to the user of selecting that specific clickable reaction button.

Returning to FIG. 1, at step 106, one or more of the systems described herein may, in response to receiving the click of the clickable reaction button within the graphical user interface of the media recording application, perform both (i) capturing, by the media recording application, media content through the input device and (ii) recording metadata indicating that a user reacted to the captured media content such that the metadata specifies a reaction that corresponds to the clickable reaction button. For example, at step 106, performance module 206 of FIG. 2 may perform, in response to receiving the click of button 408 within the graphical user interface of the media recording application, both (i) capturing, as part of the media recording application, media content by the input device and (ii) recording metadata indicating that a user reacted to the specified content such that the metadata specifies a reaction that corresponds to the clickable reaction button. As used herein, the phrase "perform both" when used at step 106 generally refers to the clicking of the clickable reaction button functioning as a sufficient trigger to trigger the performance of both (i) capturing media content by the input device and (ii) recording metadata indicating that a user reacted to the specified content such that the metadata specifies a reaction that corresponds to the clickable reaction button. In some examples, both of these features may be performed simultaneously in response to clicking of the clickable reaction button at step 106. In other examples, these features may be performed in sequence in response to clicking of the clickable reaction button.

Furthermore, as used herein, the phrase "such that the metadata specifies a reaction that corresponds to the clickable reaction button" generally refers to either (i) the metadata specifying a reaction that corresponds to a sentiment, emotion, feeling, or other reaction indicated by a graphic of the clickable reaction button (e.g., button 402, button 404, button 406, button 408, button 410, and/or button 414) or (ii) the metadata recording the additional media content that was recorded in response to the clicking of the clickable reaction button (e.g., button 412), thereby enabling the user to record a voice or other additional media recording during which the user may describe how the user is reacting to the previously recorded media content, such as the photograph captured by the camera application, as discussed further above in connection with FIG. 4.

In the case of recording additional media content (e.g., using button 412), the additional media content describing previously recorded media content may correspond to the metadata of step 106, whereas the previously recorded media content (e.g., the photograph of the cityscape shown in FIG. 4) may correspond to the recorded media content of step 106. In general, performance module 206 may perform step 106 at least in part by storing the recorded media content and also the recorded metadata in a data structure or other configuration that associates, or links, these two items of information together, such that a corresponding social networking application may reference this association and thereby indicate through the graphical user interface that these two items of information are associated together. In other words, performance module 206 may perform step 106 at least in part by storing the recorded media content and storing the recorded metadata in a manner that specifies that the recorded metadata refers to that specific recorded media content rather than other media content. Performance module 206 may similarly associate a timestamp and/or geolocation or other location identifier with the captured media content and/or the recorded metadata.

Figure 5:
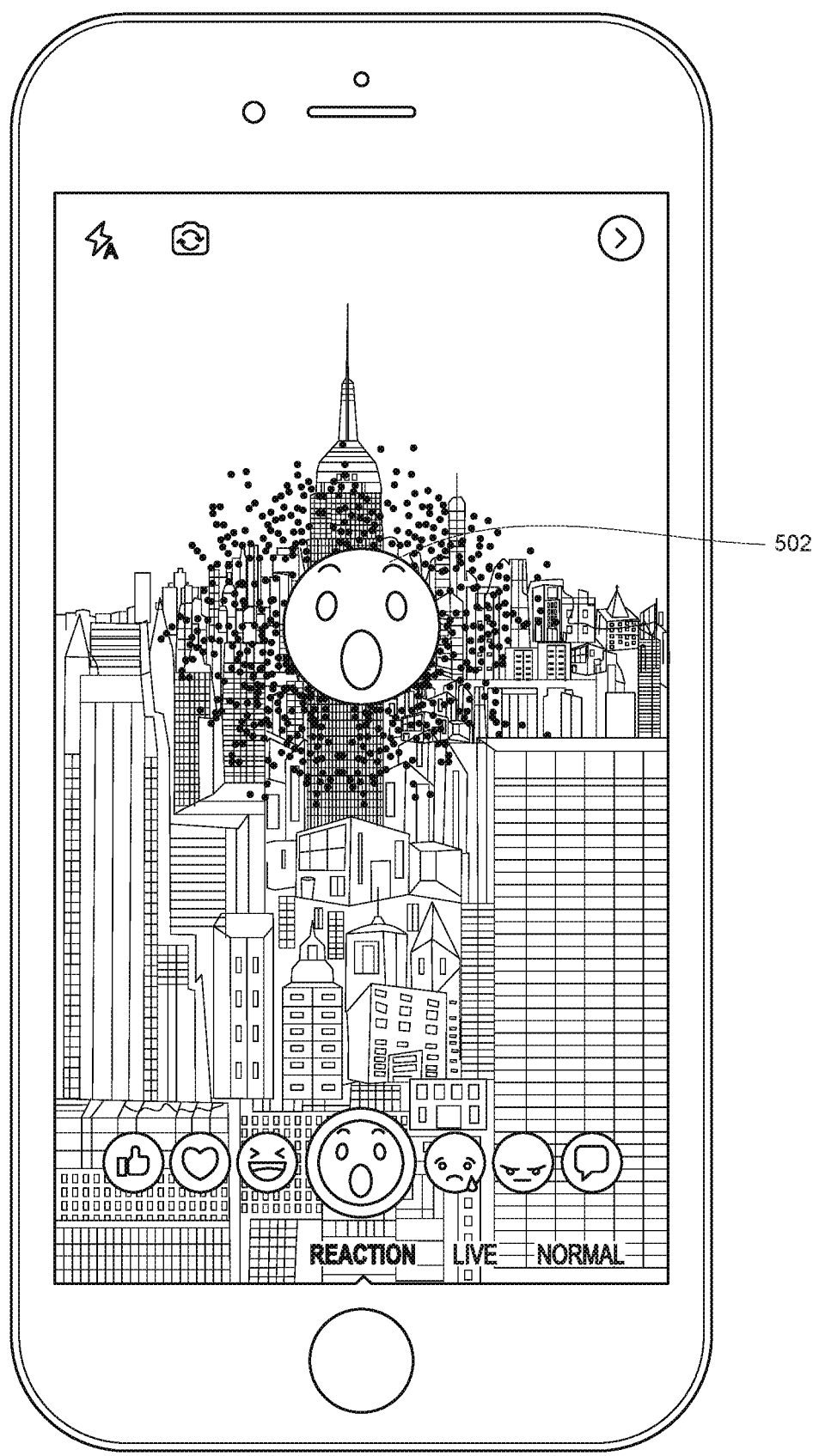
FIG. 5 is an illustration of another view of the graphical user interface for capturing content after the user has clicked the clickable reaction button.

In addition to recording the media content and corresponding metadata at step 106, performance module 206 may also perform one or more additional features. For example, performance module 206 may perform, in response to receiving the click of the clickable reaction button within the graphical user interface of the media recording application, displaying an additional instance of a graphic of the clickable reaction button to confirm to the user that the clickable reaction button was successfully selected. For example, FIG. 5 shows another illustration of the graphical user interface after the user successfully clicked button 408. As further shown in FIG. 5, in response to reception module 204 receiving the click of the clickable reaction button, performance module 206 may further display a confirmation graphic 502 that further confirms to the user that the clickable reaction button was successfully selected. In this example, confirmation graphic 502 may include an additional instance of a graphic corresponding to the clickable reaction button (e.g., an additional instance of the surprise-face corresponding to button 408). Moreover, in this example, confirmation graphic 502 may be substantially larger in size than a size of the graphic of button 408. Furthermore, in this example, confirmation graphic 502 may optionally include a graphical display of confetti, sparkles, or other celebratory items, thereby indicating a kind of celebration of the successful clicking of the clickable reaction button. In some examples, the graphical display of confetti, sparkles, or other celebratory items may be animated.

Similarly, in additional or alternative examples, performance module 206 may also display, in response to receiving the click of the clickable reaction button within the graphical user interface of the media recording application, an additional instance of a photograph that was captured in response to receiving the click of the clickable reaction button within the graphical user interface. In these examples, performance module 206 may optionally display the additional instance of the photograph after first displaying confirmation graphic 502 shown in FIG. 5.

Figure 6:
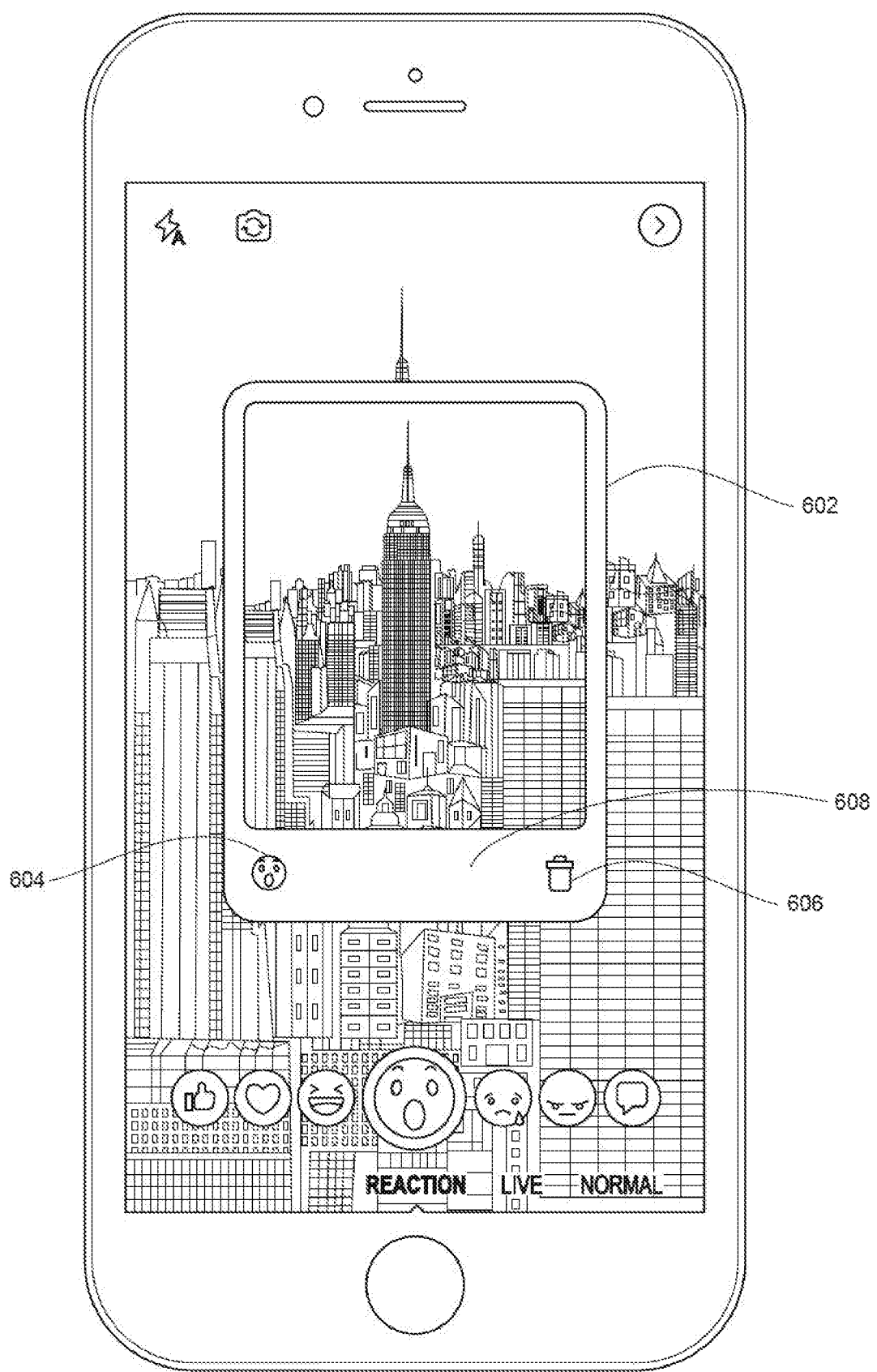
FIG. 6 is an illustration of another view of the graphical user interface for capturing content after the user has clicked the clickable reaction button.

FIG. 6 shows an example of how performance module 206 may display an additional instance 602 of the photograph that was captured in response to receiving the click of the clickable reaction button within the graphical user interface. In general, performance module 206 may optionally display additional instance 602 of the photograph in a preview mode that displays a smaller version of the photograph than the version previously shown within the viewfinder portion of the graphical user interface (e.g., the smaller additional instance 602 of the photograph is laid over the larger version of the photograph, as shown in FIG. 6). In general, the preview mode may enable the user to preview or review captured media content and thereby make a determination about whether to perform a further saving step to save the captured media content or, instead, discard the captured media content.

Moreover, in these examples, performance module 206 may also optionally display, within the additional instance of the photograph that was captured in response to receiving the click of the clickable reaction button within the graphical user interface, an additional instance of a graphic of the clickable reaction button to confirm to the user that the clickable reaction button was successfully selected in association with the photograph. In the example of FIG. 6, performance module 206 further displays, within additional instance 602, an additional instance 604 of a graphic of button 408. As further shown in this figure, additional instance 604 includes a copy of the same surprise-face icon included within button 408. Moreover, as further shown in this figure, additional instance 604 of the graphic of the clickable reaction button is significantly smaller in size than the corresponding graphic of button 408, which is consistent with the preview mode of displaying additional instance 602 of the photograph.

Additionally, in these examples, performance module 206 may also optionally display, within the additional instance of the photograph that was captured in response to receiving the click of the clickable reaction button within the graphical user interface, a clickable trash button that enables the user to discard the captured photograph rather than saving the captured photograph. Additionally, or alternatively, in some examples the user may also swipe the entire additional instance of the photograph to the side of the screen to discard the captured photograph. For example, FIG. 6 further illustrates how performance module 206 may optionally display a clickable trash button 606 within additional instance 602 of the photograph of the cityscape originally shown in FIG. 4. Accordingly, the user may optionally select clickable trash button 606 to thereby dispose or discard of the captured photograph.

In some examples, performance module 206 may specify a specific duration of time during which the user will have the option to select clickable trash button 606 and thereby dispose or discard of the captured photograph. In these examples, performance module 206 may automatically perform a further saving step of the captured photograph after the specific duration of time elapses without the user having selected clickable trash button 606 or otherwise indicated a command to discard the captured media content. Moreover, during the duration of the specified period of time, the user may also optionally select an additional clickable button (not shown in FIG. 6) to open up a multimedia editing application to further modify, refine, and/or edit the captured media content prior to performing the further saving step, which may archive the captured media content within the social networking application system. Alternatively, in other examples, performance module 206 may further display a clickable saving button that enables the user to affirmatively indicate a command to perform the further saving step rather than disposing or discarding of the captured photograph.

Similarly, in these examples, performance module 206 may also optionally display, within the additional instance of the photograph that was captured in response to receiving the click of the clickable reaction button, a text identifier of a name of a location of where the photograph was captured. For example, FIG. 6 illustrates how performance module 206 may further display a text identifier 608 that specifies a name of a location of where the photograph was captured.

Additionally, or alternatively, performance module 206 may also optionally display, in response to receiving the click of the clickable reaction button within the graphical user interface of the media recording application, multiple additional instances of a graphic of the clickable reaction button to confirm to the user that the clickable reaction button was successfully selected. For example, FIG. 7 further illustrates how performance module 206 may optionally display, in response to receiving the click of the clickable reaction button, multiple additional instances of a graphic of the clickable reaction button, including an instance 702 and an instance 704. This figure further illustrates how both instance 702 and instance 704 may belong to a much larger multiplicity of instances of the graphic of the clickable reaction button (e.g., button 408 originally shown in FIG. 4). For example, this figure further illustrates how the various instances of the multiplicity of instances of the graphic of the clickable reaction button may partially or entirely overlap each other in a random fashion.

Performance module 206 may optionally display the multiplicity of instances of the graphic of the clickable reaction button after performance module 206 performs the further saving step of saving the captured media content rather than disposing or discarding the captured media content, as discussed further above in more detail regarding FIG. 6. Moreover, in this example, FIG. 7 further illustrates how performance module 206 may optionally display the multiple additional instances of the graphic of the clickable reaction button along a periphery of the graphical user interface of the media recording application. Similarly, FIG. 7 also illustrates how an orientation of each one of the multiple additional instances of the graphic of the clickable reaction button may vary randomly.

In general, performance module 206 may display a multitude of additional instances of the graphic of the clickable reaction button, in a celebratory manner, to thereby help celebrate or confirm that the user successfully performed the further saving step of saving the captured media content rather than disposing or discarding the captured media content. Additionally, or alternatively, performance module 206 may display the multitude of additional instances of the graphic of the clickable reaction button directly in response to the user clicking the clickable reaction button, thereby passing the preview mode of FIG. 6, in a manner that is analogous to performance module 206 displaying confirmation graphic 502 shown in FIG. 5.

Figure 7:
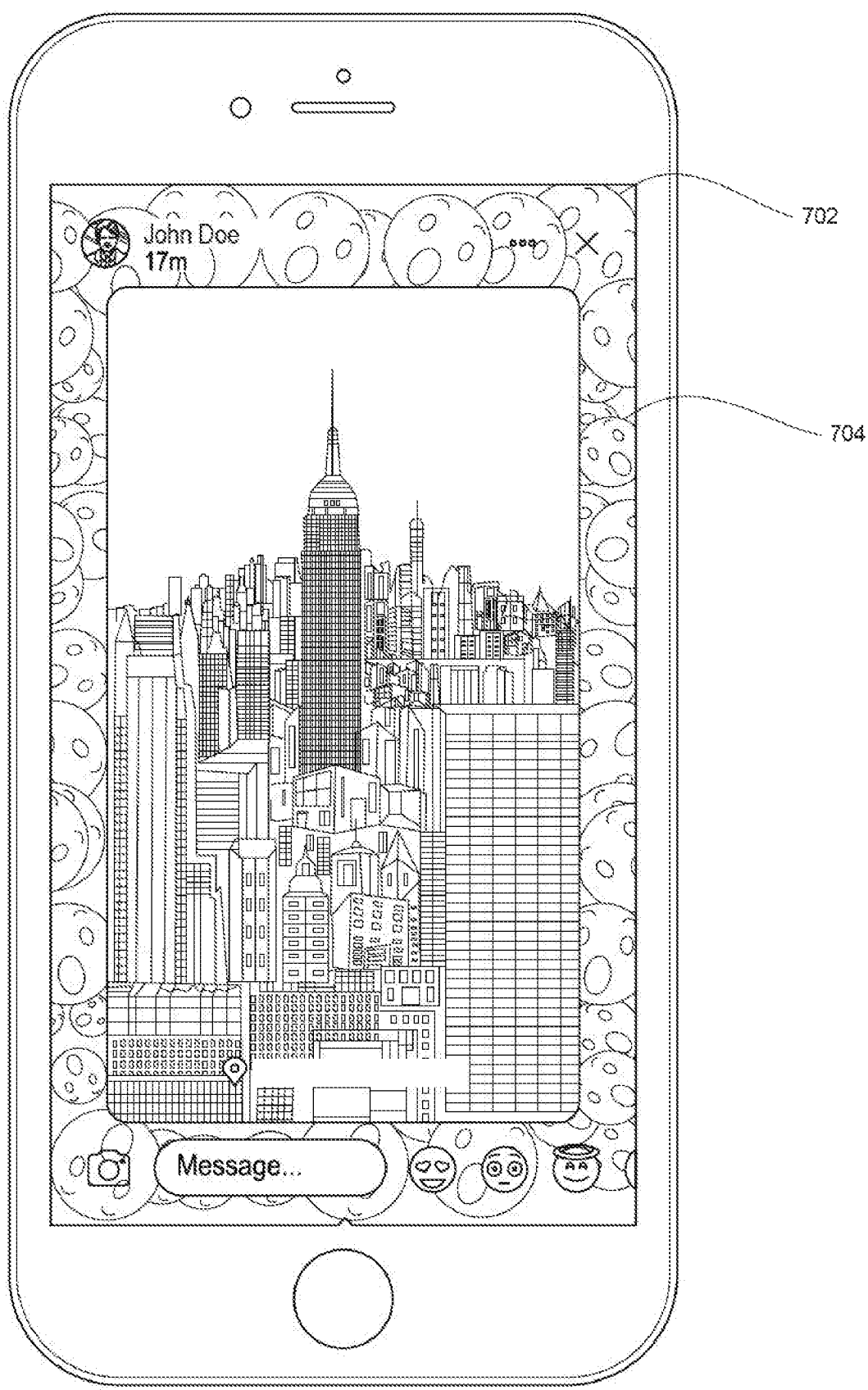
FIG. 7 is an illustration of another view of the graphical user interface for capturing content after the user has clicked the clickable reaction button such that multiple instances of a graphic of the clickable reaction button are displayed along the periphery of the graphical user interface.
Figure 8:
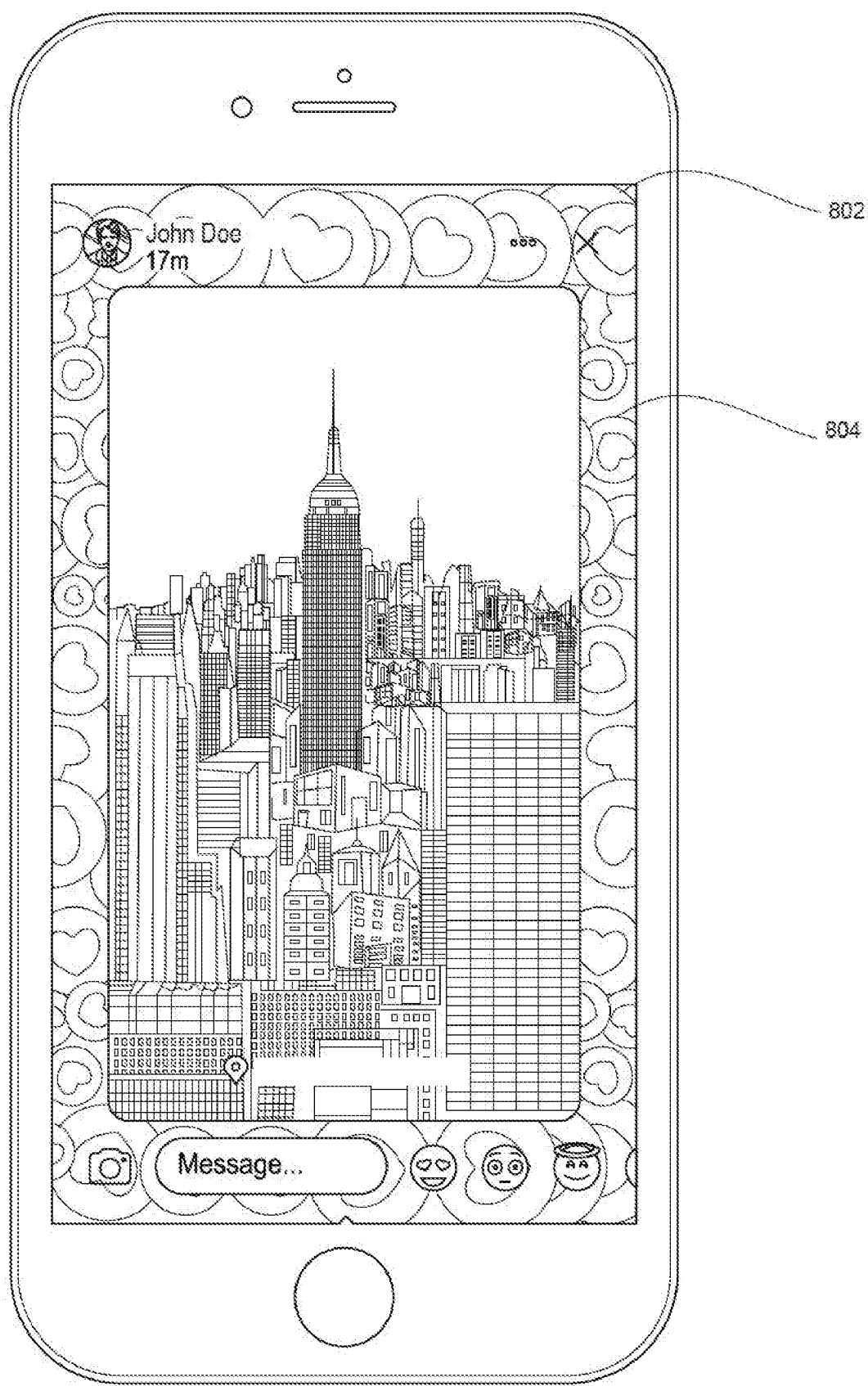
FIG. 8 is an illustration of another view of the graphical user interface for capturing content after the user has clicked the clickable reaction button such that multiple instances of a graphic of the clickable reaction button are displayed along the periphery of the graphical user interface.
Figure 9:
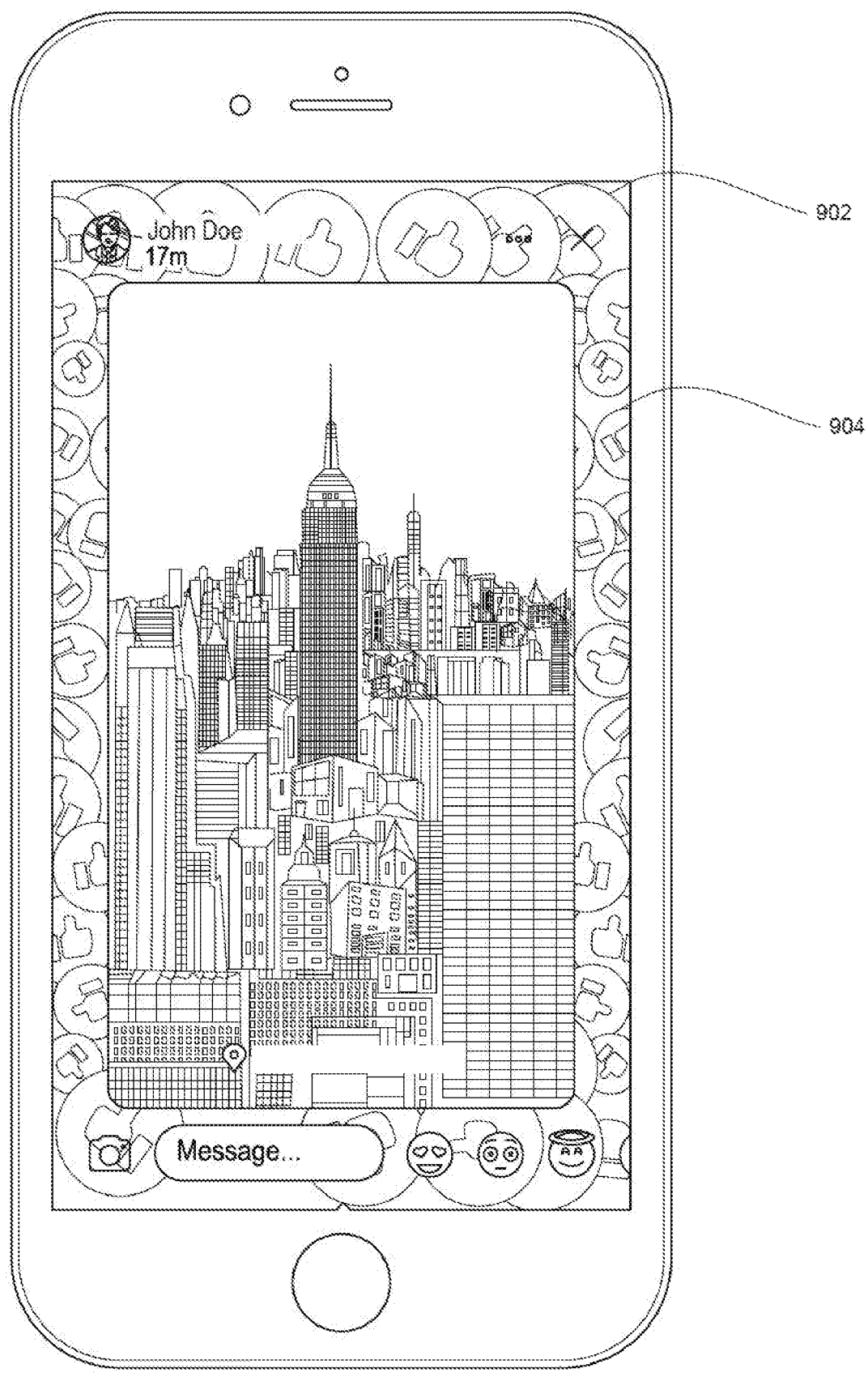
FIG. 9 is an illustration of another view of the graphical user interface for capturing content after the user has clicked the clickable reaction button such that multiple instances of a graphic of the clickable reaction button are displayed along the periphery of the graphical user interface.

For illustration purposes, FIGS. 8 and 9 show additional examples of the embodiment of FIG. 7, in which performance module 206 displays the multitude of additional instances of the graphic of the clickable reaction button, as further discussed above. In the example of FIG. 8, performance module 206 displays a multitude of additional instances of a heart graphic, corresponding to button 402 originally shown in FIG. 4, thereby indicating that in this scenario the user had selected button 402 to successfully capture the photograph rather than selecting button 408, as further discussed above. Accordingly, in the example of FIG. 8, instance 702 and instance 704 of button 408 have been replaced with an instance 802 and instance 804 of button 402. Similarly, in the example of FIG. 9, performance module 206 displays a multitude of additional instances of a thumbs-up graphic, corresponding to button 404 originally shown in FIG. 4. Accordingly, in the example of FIG. 9, instance 702 and instance 704 of button 408 have been replaced with an instance 902 and an instance 904 of button 404.

Figure 10:
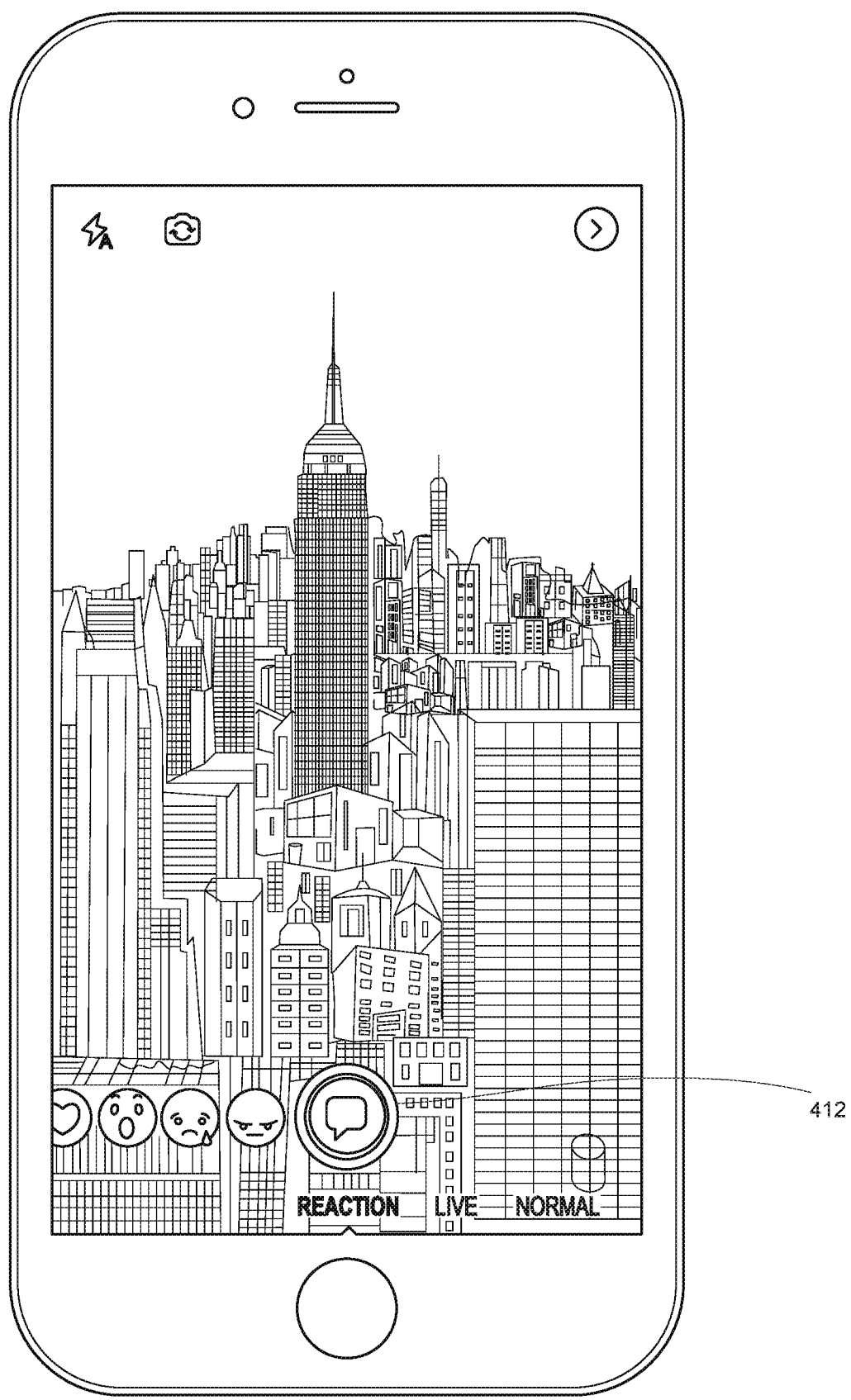
FIG. 10 is an illustration of another view of the graphical user interface for capturing content where the clickable reaction button initiates a voice recording by the user.
Figure 11:
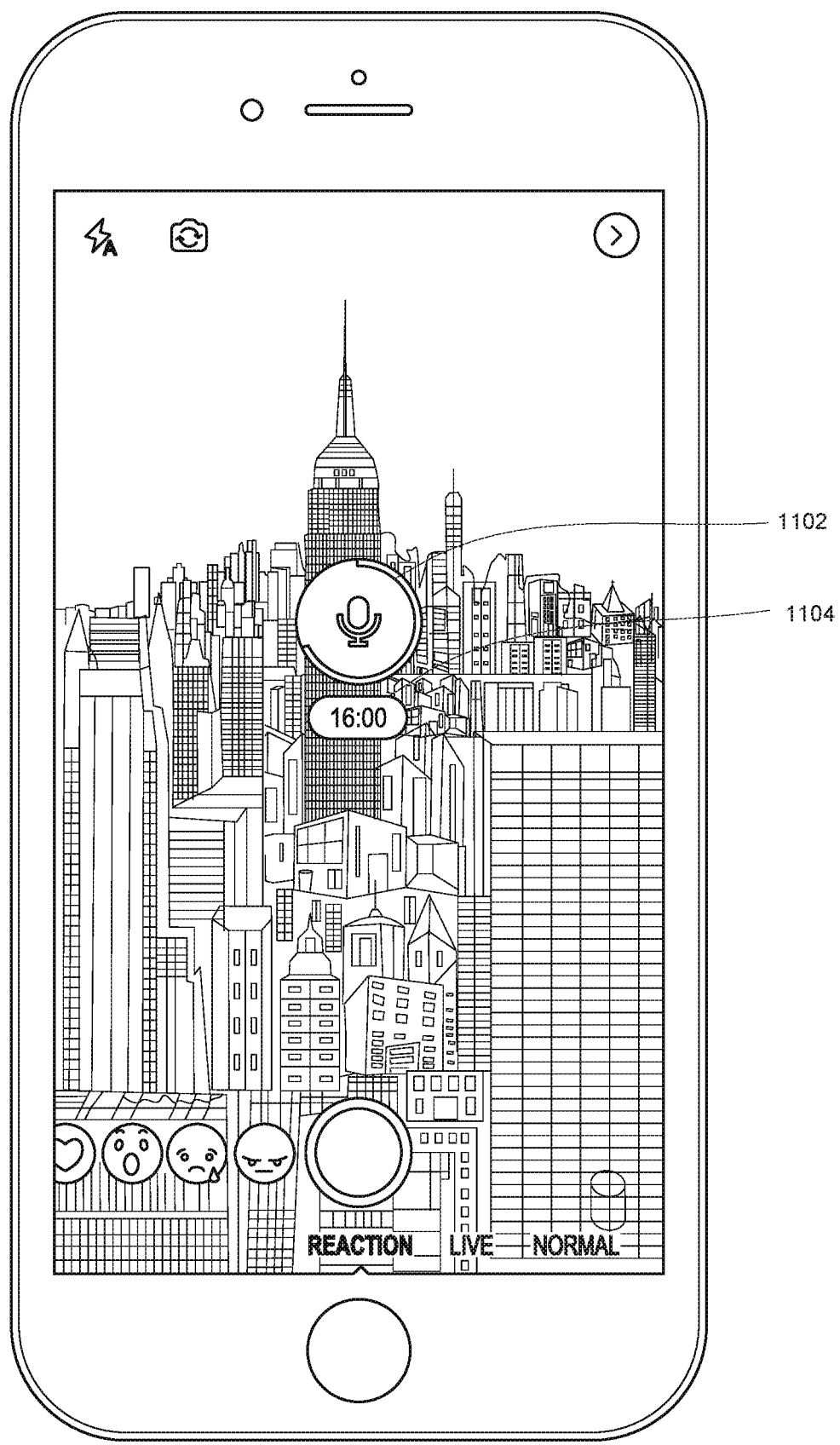
FIG. 11 is an illustration of another view of the graphical user interface for capturing content after the user has successfully clicked the clickable reaction button and initiated the voice recording.

FIGS. 10-13 show a sequence of additional views of the graphical user interface of the media recording application in the embodiment where the clickable reaction button corresponds to a clickable recording button (e.g., button 412) that, when clicked, triggers the recording of additional media content (e.g., voice media content) during which the user may describe how the user is feeling or reacting in response to the previously recorded media content, such as the photograph of the cityscape originally shown in FIG. 4. More specifically, FIG. 10 illustrates how the user may have optionally dragged button 412, which displays a corresponding dialogue icon, to the specified location, thereby activating or selecting button 412, as further discussed above in connection with FIG. 4. Subsequently, FIG. 11 illustrates how performance module 206 may optionally display, in response to the user successfully pressing button 412 at the state shown in FIG. 10, a confirmation graphic 1102 that conforms to the user that additional media recording, such as voice recording through a microphone, is being performed. For example, confirmation graphic 1102 of FIG. 11 optionally includes an icon of a microphone, thereby further indicating to the user that microphone recording is successfully being performed. Additionally, or alternatively, FIG. 11 also illustrates how performance module 206 may optionally display a time indicator 1104 that further specifies a duration of time since the beginning of recording the additional media content in response to the successful pressing of button 412.

Figure 12:
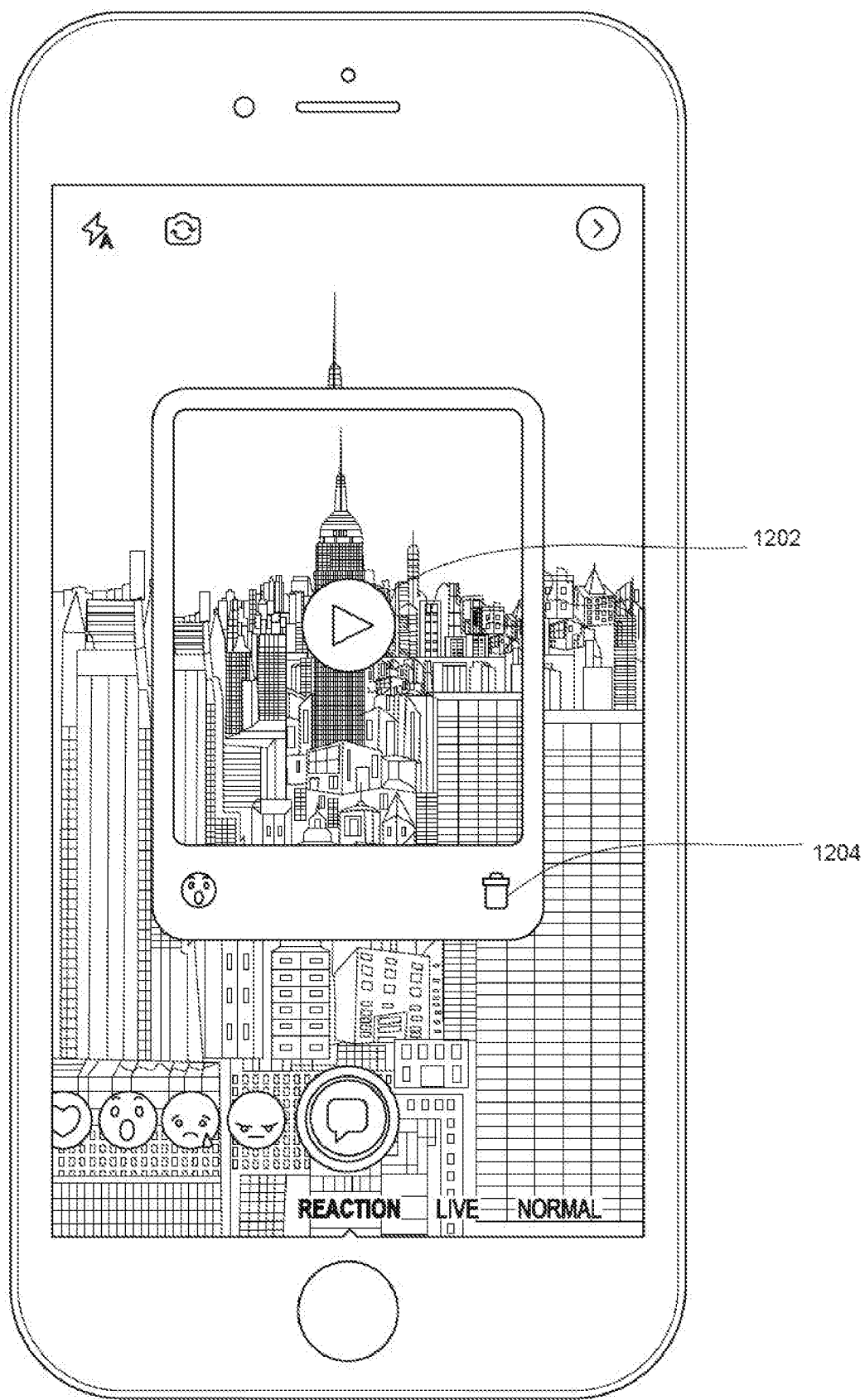
FIG. 12 is an illustration of another view of the graphical user interface for capturing content after the user has successfully captured a voice recording.

Furthermore, FIG. 12 illustrates a subsequent stage of the graphical user interface after the user successfully recorded additional media content, as described above in connection with FIG. 11. After the user successfully records the additional media content, performance module 206 may optionally display an additional instance of the previously recorded media content (e.g., the photograph of the cityscape originally shown in FIG. 4). Accordingly, the embodiment of FIG. 12 may be analogous to the preview mode embodiment of FIG. 6, as further described above. Additionally, in the example of FIG. 12, performance module 206 may also optionally display a clickable play button 1202. Accordingly, when the user successfully presses clickable play button 1202, performance module 206 may play back in response the additional media content (e.g., the additional voice recording) that the user recorded to describe how the user was feeling or reacting in response to the previously recorded media content (e.g., the photograph of the cityscape), as discussed further above in connection with FIG. 11.

Figure 13:
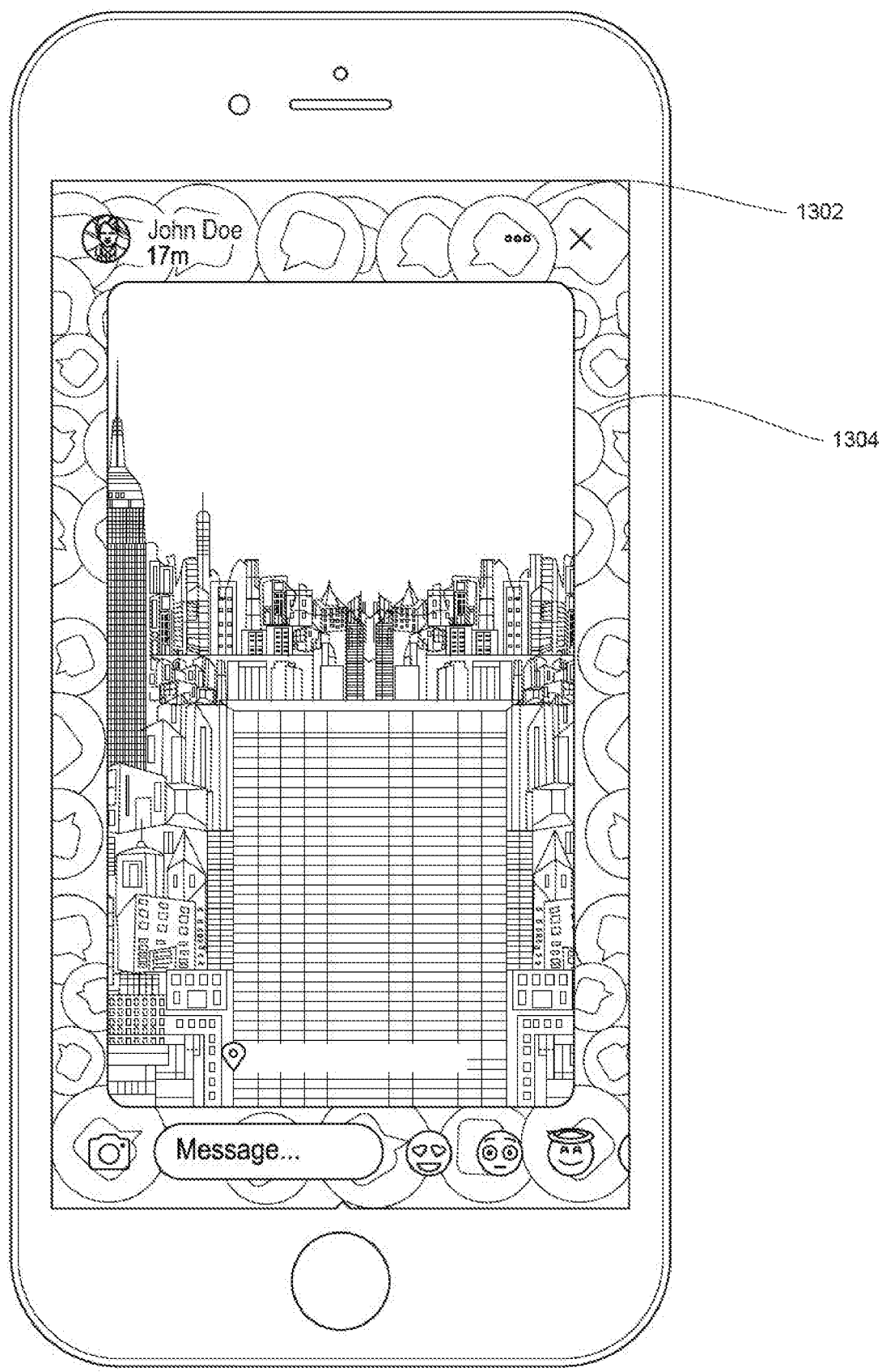
FIG. 13 is an illustration of another view of the graphical user interface for capturing content after the user has successfully clicked the clickable reaction button and successfully captured a voice recording.

Additionally, FIG. 13 illustrates a further subsequent stage of the graphical user interface after the user successfully recorded additional media content. More specifically, FIG. 13 further illustrates how performance module 206 may optionally display multiple additional instances of a graphic of the clickable reaction button (e.g., button 412) that the user successfully pressed to record the additional media content during which the user describes how the user is feeling or reacting to the previously recorded media content. Accordingly, the embodiment of FIG. 13 may be analogous to the confirmation screen embodiments of FIG. 7, FIG. 8, and FIG. 9. In the case of FIG. 13, performance module 206 may optionally display a multitude of additional instances, including an instance 1302 and an instance 1304, of the dialogue graphic corresponding to button 412, which the user previously pressed to record the additional media content, as described further above in connection with FIG. 11.

Moreover, analogous to the embodiment of FIG. 7, FIG. 8, and FIG. 9, performance module 206 may optionally display the multitude of additional instances of the graphic of the clickable recording button, as shown in FIG. 13, to thereby indicate to the user that a further saving step was performed to save the captured media content rather than disposing or discarding the captured media content. For example, performance module 206 may perform the further saving step after a specified duration of time elapses during which the user fails to press a clickable trash button 1204 (or otherwise indicates a command to discard the captured media content) that is further illustrated in FIG. 12. Alternatively, performance module 206 may perform the further saving step in response the user affirmatively selecting a clickable save button, which performance module 206 may display within the additional instance of the captured photograph.

FIGS. 14-17 show a sequence of examples of a graphical user interface of the social networking application that may be used in connection with the media recording application of FIGS. 3-13. More specifically, FIGS. 14-17 illustrate an internal-application-discovery embodiment that enables a user to discover, within the corresponding social networking application, one or more instances of captured content that the user or another user previously captured in accordance with method 100. The internal-application-discovery embodiment may be performed in addition to, or an alternative to, method 100, as described above in connection with FIGS. 3-13.

Figure 14:
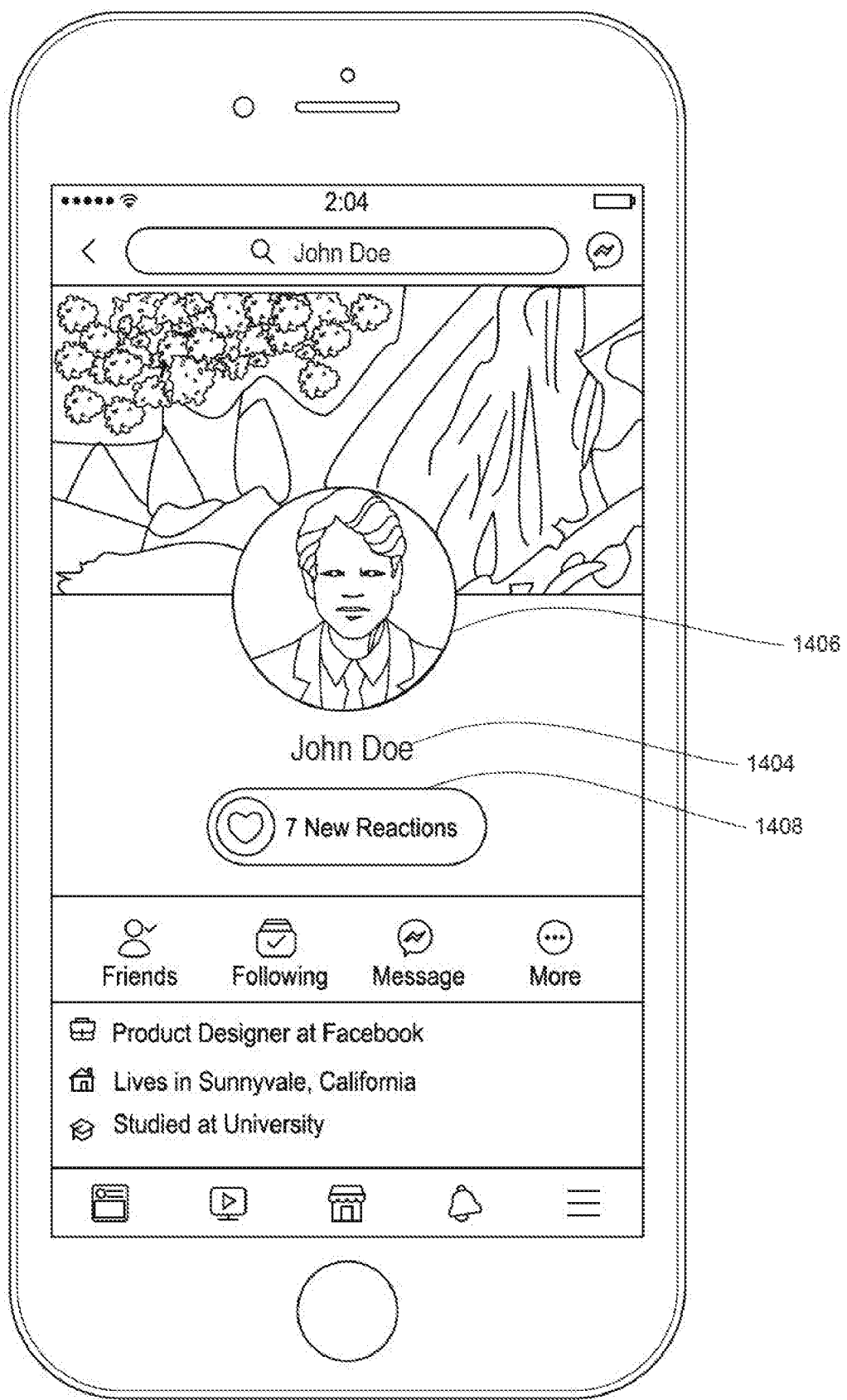
FIG. 14 is an illustration of another view of the graphical user interface for capturing content in which a friend of the user may navigate through the user's profile to browse through instances of media content previously captured by the user.

For example, FIG. 14 begins the sequence by illustrating how a user may navigate to a user profile of himself or herself, or another user. In the specific example, FIG. 14 illustrates a user profile for a user, "John Doe," including a name indicator 1404 that indicates the name of this user, as well as a user profile picture 1406, which may show a user profile picture that the user uploaded to the social networking application to represent himself or herself. Furthermore, FIG. 14 also illustrates how performance module 206 may display a clickable reactions review button 1408. Accordingly, a user that has navigated to the user profile shown in FIG. 14 may optionally press clickable reactions review button 1408 to thereby further navigate to a reactions review panel page 1500, which is further shown in FIG. 15.

Figure 15:
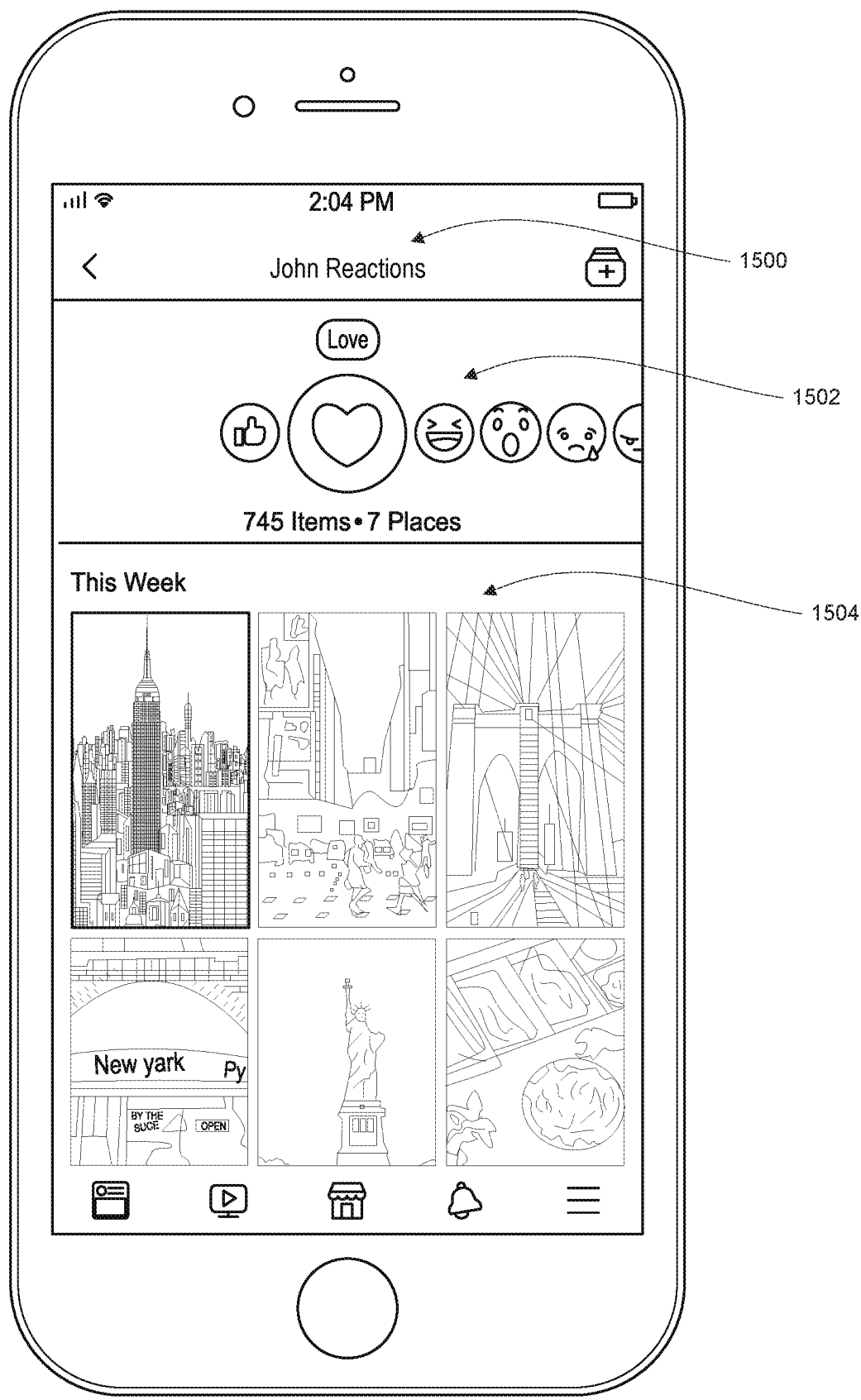
FIG. 15 is an illustration of another view of the graphical user interface for capturing content in which the friend of the user may navigate to the user's profile to browse through instances of media content previously captured by the user.

FIG. 15 further illustrates reactions review panel page 1500, which may provide an opportunity for the browsing user to further review media content that the user of the user profile (e.g., John Doe in this example) previously captured in accordance with method 100. For example, reactions review panel page 1500 may optionally include a series 1502 of clickable reaction buttons. As further shown in FIG. 15, series 1502 of clickable reaction buttons may generally correspond to the multiple clickable reaction buttons shown within the media recording application of FIG. 4. Analogous to the multiple clickable reaction buttons shown in FIG. 4, series 1502 of clickable reaction buttons may also be draggable or swipeable in one or more directions, which may thereby enable the user to relocate one or more of the clickable reaction buttons to a specific location, such as the center of series 1502 (as shown in FIG. 15). Moreover, and again analogous to the multiple clickable reaction buttons shown in FIG. 4, performance module 206 may optionally display the clickable reaction button disposed at the specific location using a larger size than a remainder of series 1502 of clickable reaction buttons, thereby indicating that this specific clickable reaction button has been successfully selected. In the example of FIG. 15, a clickable reaction button with a heart graphic, corresponding to button 402 originally shown in FIG. 4, has been relocated to the specific location and displayed in the larger size, thereby indicating that this specific clickable reaction button has been successfully selected.

Whereas, in the example of FIG. 4, dragging a specific clickable reaction button to the specific location may enable the user to successfully press the clickable reaction button and thereby capture media content, in the example of FIG. 15, dragging the specific clickable reaction button to the specific location may perform a filtering function that filters previously recorded instances of media content, from among a larger set of previously recorded instances of media content, such that only those previously recorded instances that were associated with the reaction specific to the selected clickable reaction button are displayed. For example, in the case of FIG. 15, the heart clickable reaction button has been selected, as described above, and therefore icons for instances of previously recorded media content that the user captured using the heart clickable reaction button are displayed within a gallery pane 1504. In other words, each of the thumbnail images shown in gallery pane 1504 may correspond to a photograph, video recording, or other media recording that the user recorded using the heart clickable reaction button, thereby both capturing the media content and indicating that the user reacted to the media content with a feeling of warmth or love. Accordingly, in this way the original pressing of the clickable reaction button (e.g., in accordance with FIG. 4) may provide a seamless single-tap operation that triggers two different functions (i.e., the recording of the media content and also the specifying of metadata indicating a user reaction to that media content), thereby streamlining the overall process of recording reactions to media content and improving a convenience factor for the end-user of the social networking application. By tapping on one or more of the thumbnail graphics in gallery pane 1504, the browsing user may thereby access and/or view the underlying and previously recorded media content.

Figure 16:
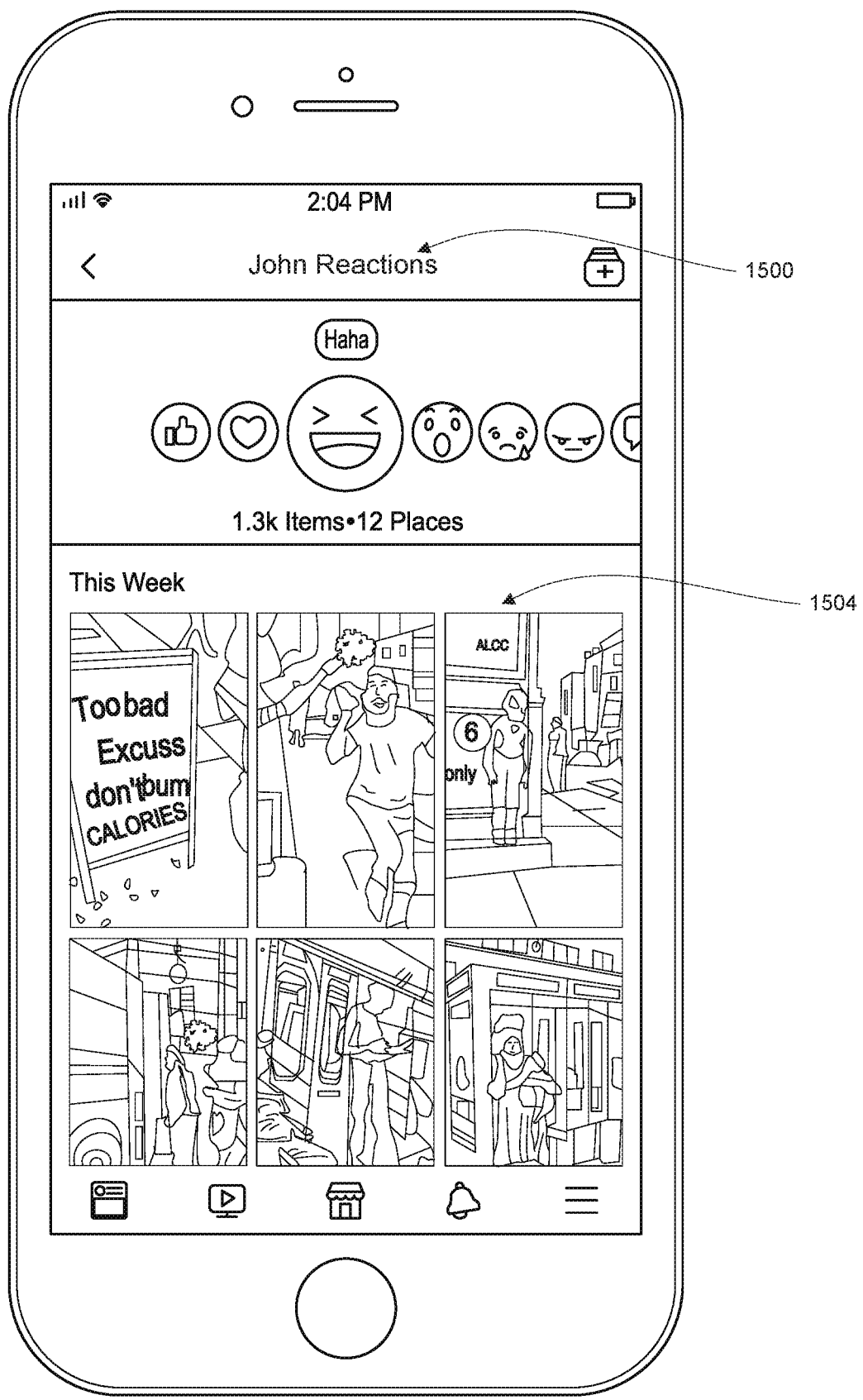
FIG. 16 is an illustration of another view of the graphical user interface for capturing content in which the friend of the user may navigate to the user's profile to browse through instances of media content previously captured by the user.

FIG. 16 shows another example of reactions review panel page 1500, in which case the browsing user has selected the laughing-face clickable reaction button, corresponding to button 406 originally shown in FIG. 4, rather than selecting the heart clickable reaction button. Accordingly, gallery pane 1504 in FIG. 16 has switched to showing thumbnail graphics for a different set or series of previously recorded instances of media content. The switching of the thumbnail graphics in comparison between FIG. 16 and FIG. 15 reflects the fact that the user selected the laughing-face clickable reaction button, rather than the heart clickable reaction button, and therefore gallery pane 1504 displays instances of previously recorded media content that the user had captured using the laughing-face clickable reaction button rather than instances that the user had captured using the heart clickable reaction button. Generally speaking, the user may press the laughing-face clickable reaction button to both capture underlying media content and also record metadata specifying that the user reacted to the media content with happiness, joy, or merriment, etc.

Figure 17:
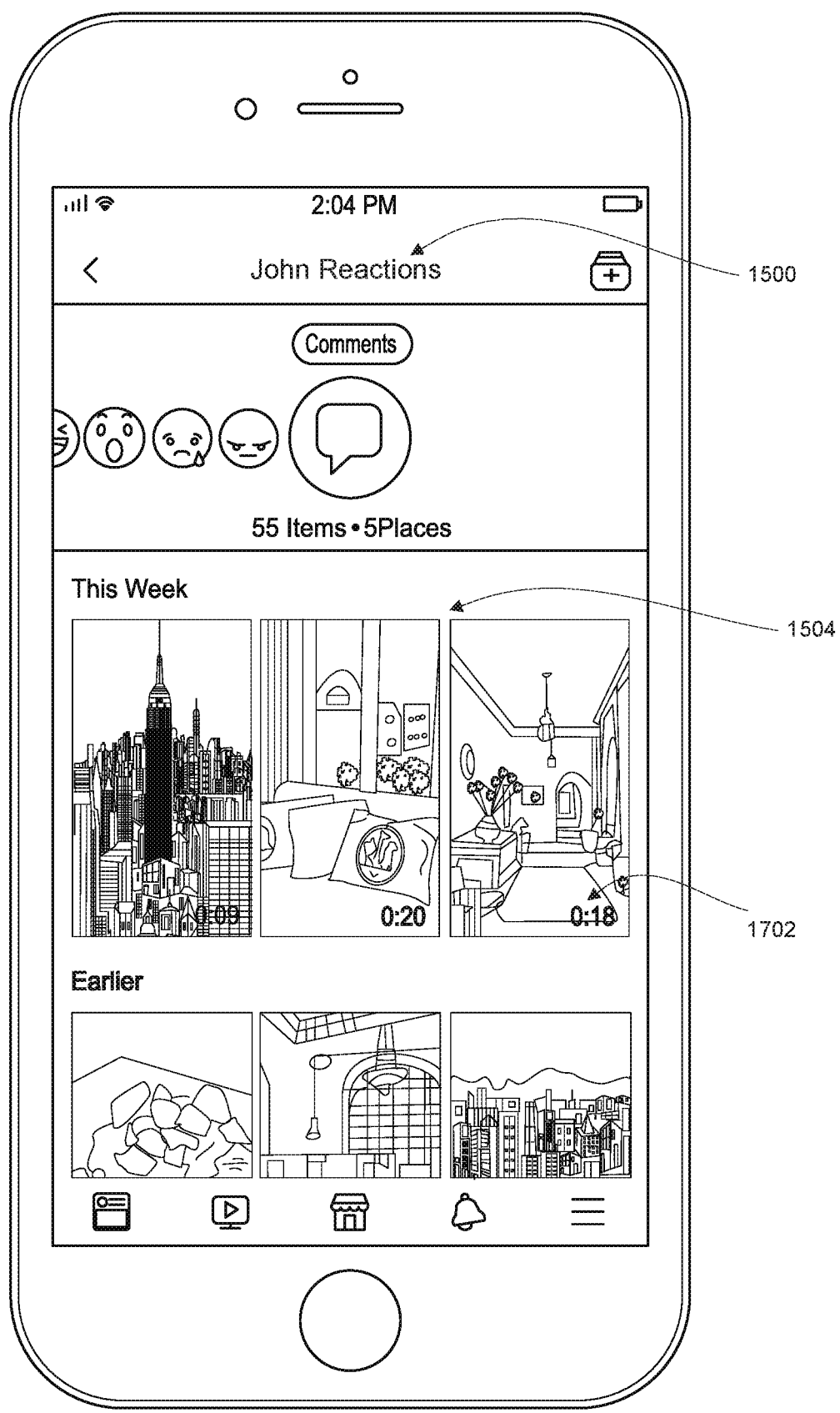
FIG. 17 is an illustration of another view of the graphical user interface for capturing content in which the friend of the user may navigate to the user's profile to browse through instances of media content previously captured by the user.

Similarly, FIG. 17 shows another example of reactions review panel page 1500, in which case the browsing user has selected the dialogue clickable reaction button, corresponding to button 412 originally shown in FIG. 4, rather than selecting the heart clickable reaction button or the laughing-face clickable reaction button. Accordingly, gallery pane 1504 in FIG. 17 has switched again to display a different set or series of instances of previously recorded media content. In this example, one or more of the thumbnail graphics shown within gallery pane 1504 may include a time indicator, such as a time indicator 1702, which may further specify a duration of the additional recorded media content (e.g., the additional voice recording) that the user recorded to describe how the user was reacting to the previously recorded media content (e.g., the photograph of the cityscape corresponding to FIG. 4). Accordingly, the dialogue clickable reactions button embodiment of FIG. 17 may generally correspond to the embodiment of FIGS. 10-13, as described in more detail above regarding those figures.

FIGS. 18-23 show a sequence of examples of a graphical user interface, corresponding to the social networking application, in accordance with an external-application-discovery embodiment. In the external-application-discovery embodiment, performance module 206 may notify the user, when the user enters a specific location or vicinity (e.g., using geolocation tracking and/or monitoring), about one or more instances of previously recorded media content that the same user recorded in accordance with method 100. The external-application-discovery embodiment may be external in the sense that the user may still receive the notification even if the user is not currently executing and/or navigating through the social networking application within the user's computing device, such as a smartphone or tablet. For example, in the external-application discovery embodiment, the user may receive a notification through a general-purpose notification system provided by a corresponding mobile computing device operating system environment, such as a notification within a general-purpose notification system provided by the operating system environments.

Figure 18:
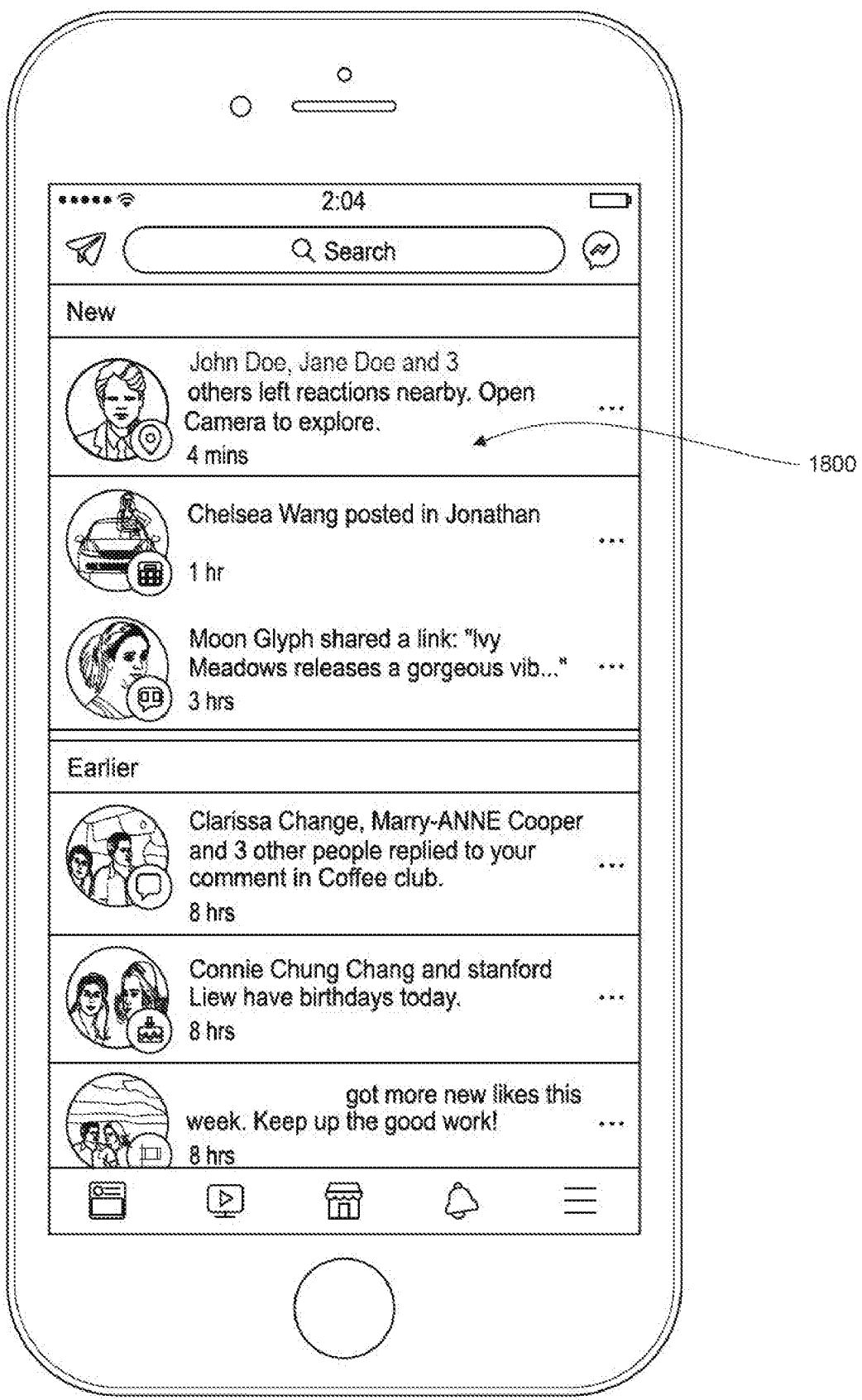
FIG. 18 is an illustration of another view of the graphical user interface for capturing content in which the user may be notified, upon entering a location, about one or more other reactions that a friend of the user recorded within the same vicinity.

FIG. 18 begins the sequence by showing an example of the graphical user interface in which the user is notified, via a notification 1800, that others have left reactions in accordance with method 100 in the same location or vicinity that the user just entered. The graphical user interface of FIG. 18 may optionally be displayed within the social networking application, which the user may have toggled upon selecting a general-purpose notification that was issued by the social networking application, when executing in the background of the mobile computing device operating system environment, through the operating system environment notification system.

Figure 19:
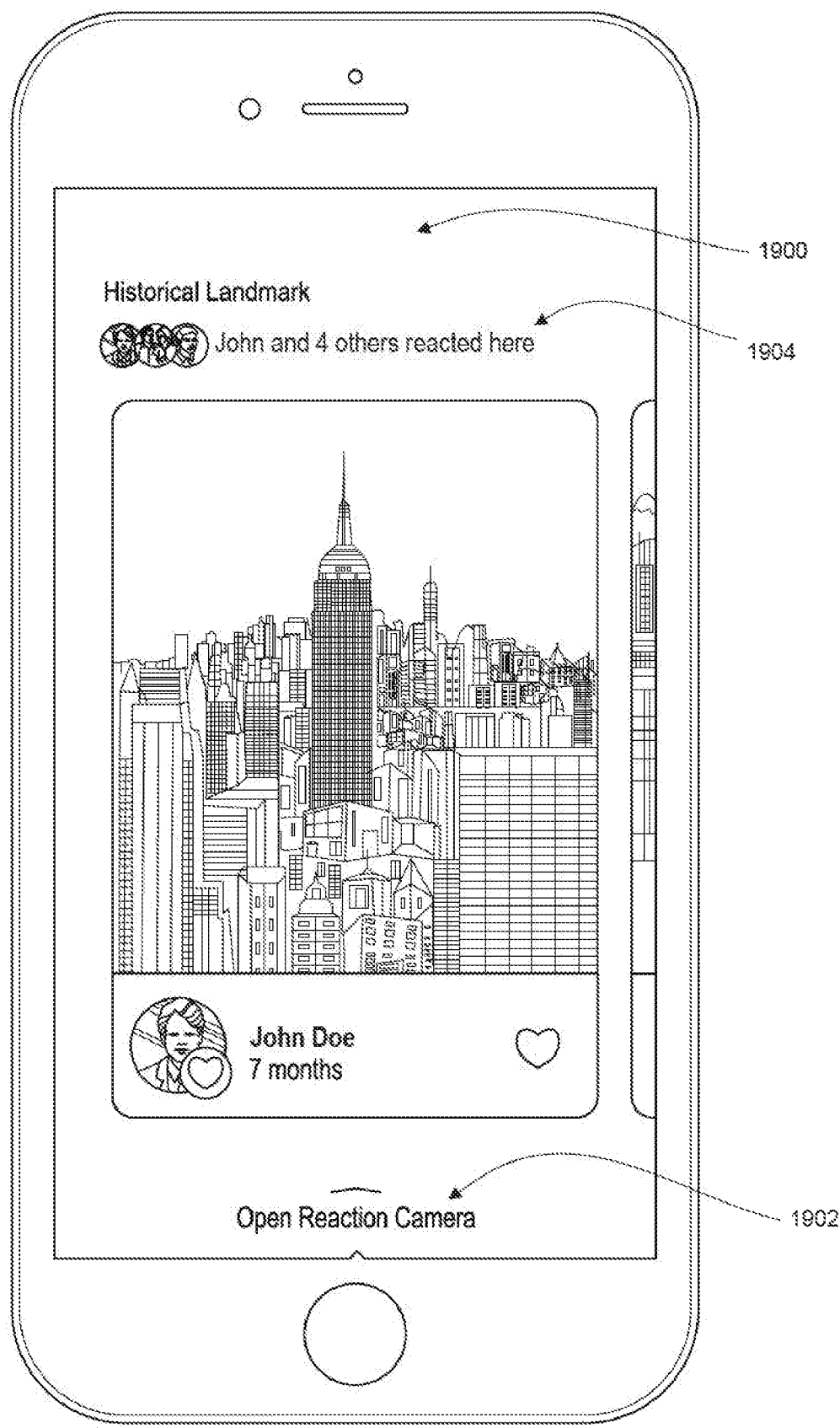
FIG. 19 is an illustration of another view of the graphical user interface for capturing content in which the user may be notified, upon entering the location, about one or more other reactions that a friend of the user recorded within the same vicinity.

Upon selecting notification 1800 within the graphical user interface of FIG. 18, the user may navigate to a reaction review pane 1900, as shown in FIG. 19. In some examples, the general configuration of the graphical user interface of FIG. 19 may parallel the preview-mode embodiment that is discussed in more detail above regarding FIG. 6 and FIG. 12. The graphical user interface of FIG. 19 may also display an indicator 1904 that indicates to the browsing user which users previously left reactions at this same location or vicinity in accordance with method 100. Moreover, the graphical user interface of FIG. 19 also optionally displays a prompt 1902 that the browsing user may optionally press to thereby open the media recording application, such as the media recording application discussed above in connection with FIG. 4.

Figure 20:
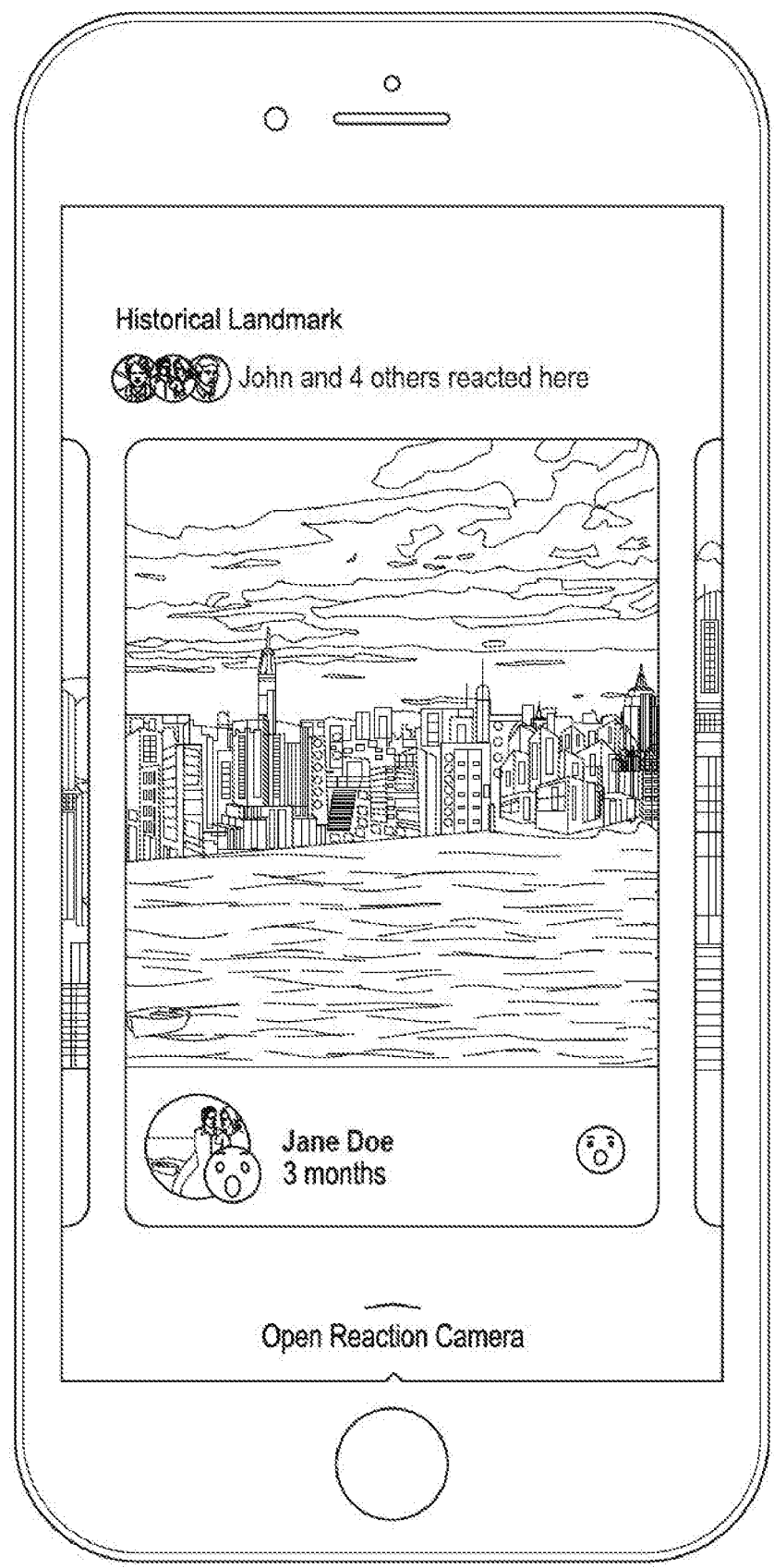
FIG. 20 is an illustration of another view of the graphical user interface for capturing content in which the user may be notified, upon entering the location, about one or more other reactions that a friend of the user recorded within the same vicinity.
Figure 21:
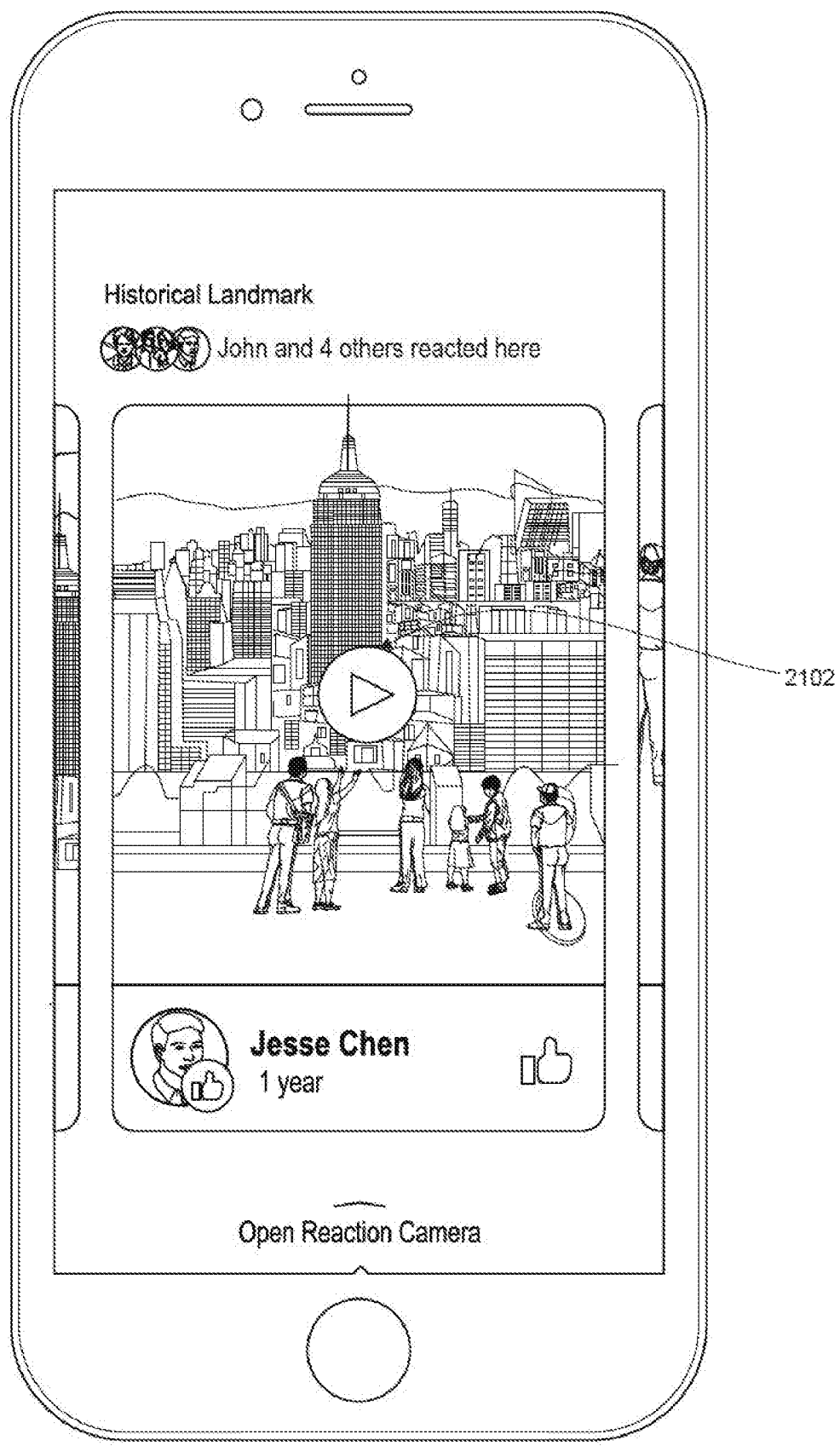
FIG. 21 is an illustration of another view of the graphical user interface for capturing content in which the user may be notified, upon entering the location, about one or more other reactions that a friend of the user recorded within the same vicinity.
Figure 22:
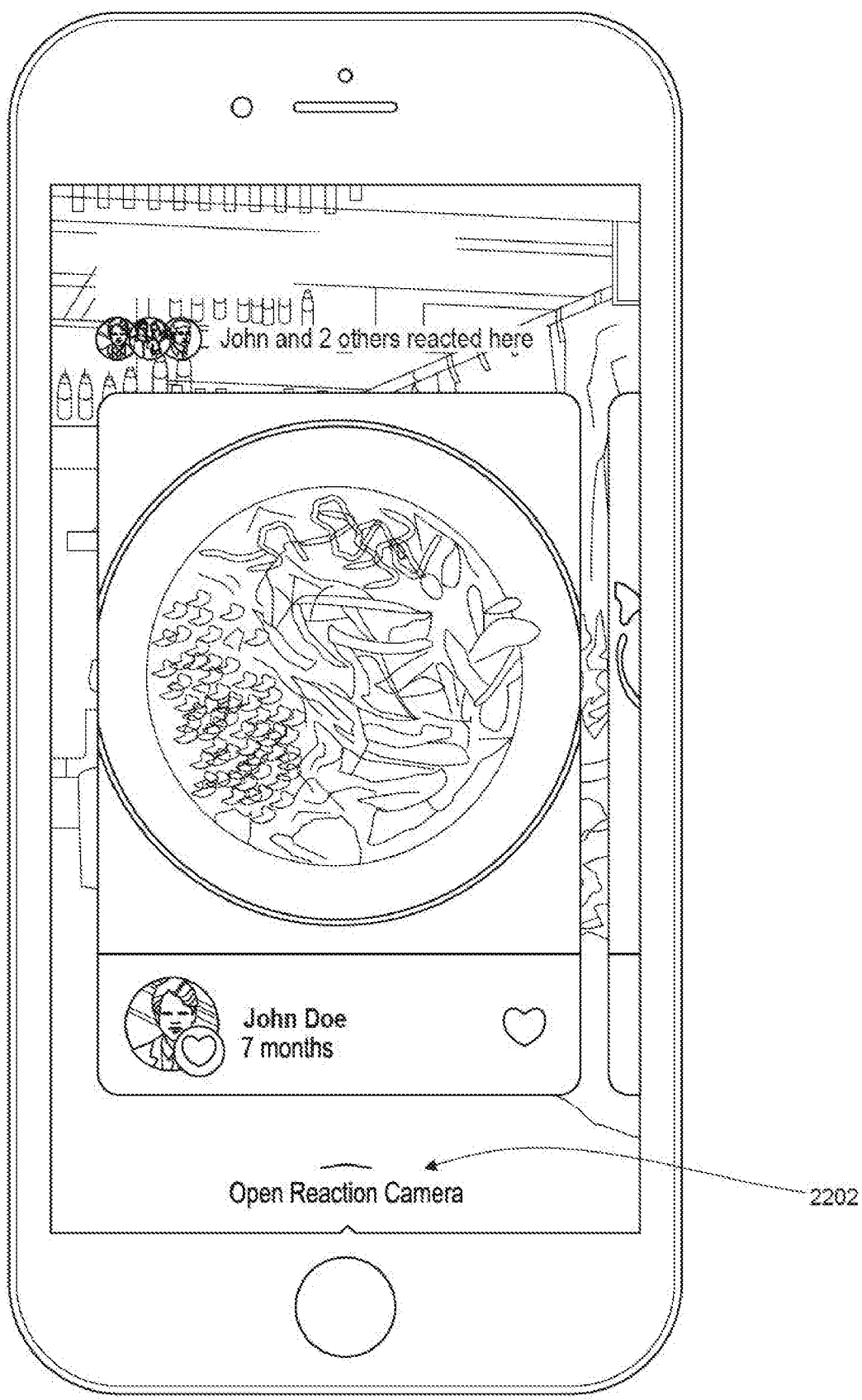
FIG. 22 is an illustration of another view of the graphical user interface for capturing content in which the user may be notified, upon entering the location, about one or more other reactions that the user previously recorded within the same vicinity.

FIGS. 20-22 show different illustrative examples of previously recorded media content that the user recorded in accordance with method 100, and which the browsing user may browse through in accordance with the external application discovery embodiment. For example, FIG. 20 shows another item of previously recorded media content that a different user (i.e., "Jane Roe," rather than "John Doe") recorded, in accordance with method 100, at the same location or vicinity as in FIG. 4 and FIG. 19. A comparison between FIG. 19 and FIG. 20 further illustrates how, in the example of FIG. 19, John Doe had captured media content at the same location using the heart clickable reaction button, corresponding to button 402 originally shown in FIG. 4, thereby indicating that John Doe felt warmth or love at this specific location, whereas, in the example of FIG. 20, Jane Roe captured media content (e.g., a different photograph) using the surprise-face clickable reaction button, corresponding to button 408 of FIG. 4, thereby indicating that Jane Roe felt a feeling of surprise, wonder, and/or awe, etc., at the same location.

FIG. 21 shows another illustrative example of previously recorded media content that the user recorded in accordance with method 100, and which the browsing user may browse through in accordance with the external-application-discovery embodiment. In contrast to FIGS. 19 and 20, FIG. 21 illustrates how a third user, Jesse Chen captured media content at the same location in accordance with method 100 using the dialogue clickable reaction button, corresponding to button 412 of FIG. 4 and also corresponding to the further embodiments of FIGS. 10-13. Accordingly, FIG. 21 further includes a clickable play button 2102 that the browsing user may press to replay the additional recorded media content that user Jessie Chen recorded (e.g., through a microphone voice recording) to describe how this user felt in reaction to being at the same location or vicinity.

Figure 23:
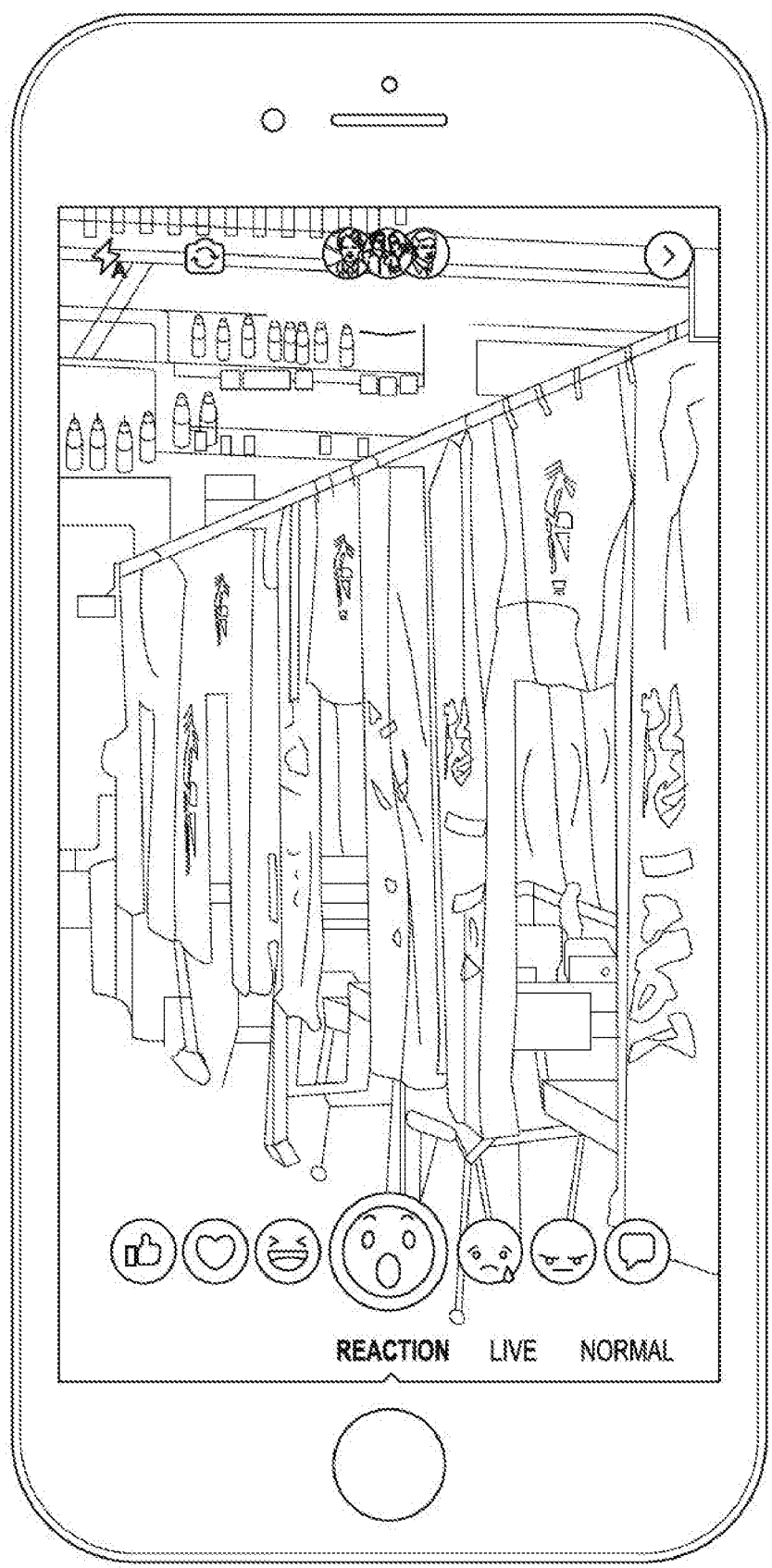
FIG. 23 is an illustration of another view of the graphical user interface for capturing content in which the user has enabled a camera application after entering the location.

Similarly, FIG. 22 shows another illustrative example of previously recorded media content of the user recorded in accordance with method 100, in accordance with the external-application-discovery embodiment. In contrast to FIGS. 18-21, FIG. 22 shows a graphical user interface in a scenario where the browsing user has entered a different location, the restaurant, rather than the location of FIGS. 18-21. Analogous to the embodiment of FIG. 19, the graphical user interface of FIG. 22 also includes a prompt 2202 that enables the browsing user to open a corresponding media recording application, such as the camera or video camera application of FIG. 4. For purposes of illustration, FIG. 23 shows an example of the graphical user interface of the media recording application that is presented to the user after selecting prompt 2202. Accordingly, FIG. 23 shows an example of the graphical user interface being opened at the location of the restaurant. In this way, if a new or different user opens the graphical user interface for the media recording application at the same location, the media recording application thereby provides an opportunity for the new or different user to co-react to the same location or vicinity by capturing a new instance of media content in accordance with method 100.

As further outlined above, the disclosed subject matter may improve upon related systems and methods by improving the level of efficiency or convenience for capturing content and also recording one or more items of information indicating how a user reacted to the captured content. The disclosed subject matter may thereby increase a proclivity of the user to capture content, to annotate the content, and to share the content with other users within a social networking application environment.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a request for a computing resource, transform the request, output a result of the transformation to a storage or output device, use the result of the transformation to initialize an environment of the computing resource, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method, comprising:
   displaying, within a graphical user interface of a media recording application that records media through an input device, a clickable reaction button;
   receiving a click of the clickable reaction button within the graphical user interface of the media recording application;
   in response to receiving the click of the clickable reaction button within the graphical user interface of the media recording application, performing both:
      capturing, by the media recording application, media content through the input device; and
      recording metadata indicating that a user reacted to the captured media content such that the metadata specifies a reaction that corresponds to the clickable reaction button; and
   in response to receiving the click of the clickable reaction button within the graphical user interface of the media recording application, displaying an additional instance of a photograph that was captured in response to receiving the click of the clickable reaction button within the graphical user interface.

2. The computer-implemented method of claim 1, wherein the media recording application is provided by a social networking service.

3. The computer-implemented method of claim 1, wherein the captured media content comprises at least one of:
   a photograph;
   an audio voice recording; and
   a video.

4. The computer-implemented method of claim 1, wherein displaying the clickable reaction button comprises displaying a plurality of clickable reaction buttons.

5. The computer-implemented method of claim 4, wherein the user is enabled to select a selected one of the plurality of clickable reaction buttons by dragging the selected one to a specified location.

6. The computer-implemented method of claim 5, wherein the specified location comprises a center of the plurality of clickable reaction buttons.

7. The computer-implemented method of claim 1, further comprising, in response to receiving the click of the clickable reaction button within the graphical user interface of the media recording application, displaying an additional instance of a graphic of the clickable reaction button to confirm to the user that the clickable reaction button was successfully selected.

8. The computer-implemented method of claim 1, wherein the captured media content comprises a photograph.

9. The computer-implemented method of claim 1, further comprising displaying, within the additional instance of the photograph that was captured in response to receiving the click of the clickable reaction button within the graphical user interface, an additional instance of a graphic of the clickable reaction button to confirm to the user that the clickable reaction button was successfully selected in association with the photograph.

10. The computer-implemented method of claim 1, further comprising displaying, within the additional instance of the photograph that was captured in response to receiving the click the clickable reaction button within the graphical user interface, a clickable trash button that enables the user to discard the captured photograph rather than saving the captured photograph.

11. The computer-implemented method of claim 1, further comprising displaying, within the additional instance of the photograph that was captured in response to receiving the click of the clickable reaction button within the graphical user interface, a text identifier of a name of a location where the photograph was captured.

12. The computer-implemented method of claim 1, further comprising displaying, in response to receiving the click of the clickable reaction button within the graphical user interface of the media recording application, a plurality of additional instances of a graphic of the clickable reaction button to confirm to the user that the clickable reaction button was successfully selected.

13. The computer-implemented method of claim 12, wherein the plurality of additional instances of the graphic of the clickable reaction button are displayed along a periphery of the graphical user interface of the media recording application.

14. The computer-implemented method of claim 13, wherein an orientation of each one of the plurality of additional instances of the graphic of the clickable reaction button varies randomly.

15. The computer-implemented method of claim 1, wherein the clickable reaction button comprises one of:
   a clickable emoji button including an emoji graphic of a facial expression for an emotion that the user felt in reaction to the captured media content;

a clickable recording button that enables the user to record a recording that describes how the user reacted to the captured media content.

16. The computer-implemented method of claim 15, wherein:
the clickable reaction button comprises the clickable emoji button; and
recording metadata indicating that the user reacted to the captured media content such that the metadata specifies a reaction that corresponds to the clickable reaction button comprises recording metadata that specifies an emotion that corresponds to the facial expression for the emotion of the emoji graphic.

17. The computer-implemented method of claim 15, wherein:
the clickable reaction button comprises the clickable recording button; and
the clickable recording button enables the user to record a voice recording that describes how the user reacted to the captured media content.

18. The computer-implemented method of claim 17, wherein the clickable recording button includes a graphic displaying a dialogue icon.

19. A system comprising:
a display module, stored in memory, that displays, within a graphical user interface of a media recording application that records media through an input device, a clickable reaction button;
a reception module, stored in memory, that receives a click of the clickable reaction button within the graphical user interface of the media recording application;
a performance module, stored in memory that, in response to receiving the click of the clickable reaction button within the graphical user interface of the media recording application, performs both:
capturing, as part of the media recording application, media content through the input device; and
recording metadata indicating that a user reacted to the captured media content such that the metadata specifies a reaction that corresponds to the clickable reaction button; and
at least one physical processor configured to execute the display module, the reception module, and the performance module;
wherein the display module is configured such that, in response to receiving the click of the clickable reaction button within the graphical user interface of the media recording application, the display module displays an additional instance of a photograph that was captured in response to receiving the click of the clickable reaction button within the graphical user interface.

20. A computer-readable medium comprising one or more computer-executable instructions that, when executed by at least one processor of a computing device, cause the computing device to:
display, within a graphical user interface of a media recording application that records media through an input device, a clickable reaction button;
receive a click of the clickable reaction button within the graphical user interface of the media recording application;
in response to receiving the click of the clickable reaction button within the graphical user interface of the media recording application, perform both:
capturing, by the media recording application, media content through the input device; and
recording metadata indicating that a user reacted to the captured media content such that the metadata specifies a reaction that corresponds to the clickable reaction button; and
in response to receiving the click of the clickable reaction button within the graphical user interface of the media recording application, display an additional instance of a photograph that was captured in response to receiving the click of the clickable reaction button within the graphical user interface.

\* \* \* \* \*